US010755242B2

(12) United States Patent
Suresh et al.

(10) Patent No.: US 10,755,242 B2
(45) Date of Patent: Aug. 25, 2020

(54) BITCOIN MINING HARDWARE ACCELERATOR WITH OPTIMIZED MESSAGE DIGEST AND MESSAGE SCHEDULER DATAPATH

(71) Applicant: Intel Corporation, Santa Clara, CA (US)

(72) Inventors: Vikram Suresh, Hillsboro, OR (US); Sudhir Satpathy, Hillsboro, OR (US); Sanu Mathew, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1007 days.

(21) Appl. No.: 15/274,200

(22) Filed: Sep. 23, 2016

(65) Prior Publication Data
US 2018/0089642 A1    Mar. 29, 2018

(51) Int. Cl.
*G06Q 20/06* (2012.01)
*G09C 1/00* (2006.01)
(Continued)

(52) U.S. Cl.
CPC ....... *G06Q 20/0658* (2013.01); *G06F 9/4881* (2013.01); *G06Q 20/02* (2013.01);
(Continued)

(58) Field of Classification Search
CPC .. G06Q 20/0658; G06Q 20/3827; G09C 1/00; H04L 9/0643; H04L 2209/56; H04L 2209/38; G06F 9/4881
See application file for complete search history.

(56) References Cited

U.S. PATENT DOCUMENTS 7,302,016 B1 * 11/2007 Rice ................ H04L 27/22
375/326
8,331,555 B1 * 12/2012 Mundschau ............ G06F 7/00
380/28
(Continued)

FOREIGN PATENT DOCUMENTS

WO    2015-077378 A1    5/2015

OTHER PUBLICATIONS

George et al., "Automated mixed-signal SoC BIST synthesis utilizing hardware accelerators," 2012 IEEE International Instrumentation and Measurement Technology Conference Proceedings Year: 2012 | Conference Paper | Publisher: IEEE.*
(Continued)

*Primary Examiner* — Roderick Tolentino
(74) *Attorney, Agent, or Firm* — Nicholson De Vos Webster & Elliott LLP

(57) ABSTRACT

A Bitcoin mining hardware accelerator is described. A System on Chip implementing a Bitcoin mining hardware accelerator may include a processor core and a hardware accelerator coupled to the processor core, the hardware accelerator to mine digital currency. The hardware accelerator may include a first computational block, including a message digest datapath, wherein the first computational block is to: precompute a first summation of a 32-bit message ($W_i$), a 32-bit round constant ($K_i$), and a content of a first shifted state register ($G_{i-1}$), and store a result of the first summation in a state register ($H_i$). The Bitcoin mining hardware accelerator may further include a second computational block comprising a message scheduler datapath.

20 Claims, 16 Drawing Sheets

(51) Int. Cl.
*G06Q 20/02* (2012.01)
*H04L 9/06* (2006.01)
*G06F 9/48* (2006.01)
*G06Q 20/38* (2012.01)

(52) U.S. Cl.
CPC ........... *G06Q 20/3827* (2013.01); *G09C 1/00* (2013.01); *H04L 9/0643* (2013.01); *G06Q 2220/00* (2013.01); *H04L 2209/125* (2013.01); *H04L 2209/38* (2013.01); *H04L 2209/56* (2013.01); *Y02D 10/24* (2018.01)

(56) References Cited

U.S. PATENT DOCUMENTS

| | | | | |
|---|---|---|---|---|
| 9,172,388 | B1* | 10/2015 | Stein | H03M 1/0609 |
| 2005/0063493 | A1* | 3/2005 | Foster | H04L 27/227 |
| | | | | 375/329 |
| 2007/0080905 | A1* | 4/2007 | Takahara | G09G 3/3258 |
| | | | | 345/76 |
| 2010/0031052 | A1* | 2/2010 | Kim | G06F 21/602 |
| | | | | 713/181 |
| 2014/0195465 | A1* | 7/2014 | Periorellis | G06N 5/02 |
| | | | | 706/12 |
| 2014/0195782 | A1 | 7/2014 | Yap et al. | |
| 2016/0112200 | A1 | 4/2016 | Kheterpal et al. | |
| 2016/0125040 | A1 | 5/2016 | Kheterpal et al. | |
| 2016/0164672 | A1 | 6/2016 | Karighattam et al. | |
| 2016/0330031 | A1* | 11/2016 | Drego | H04L 9/3239 |
| 2016/0344401 | A1* | 11/2016 | La Grou | H03M 1/08 |
| 2017/0243176 | A1* | 8/2017 | Hanke | H04L 9/3239 |

OTHER PUBLICATIONS

Khan et al., "Hardware Accelerator for Probabilistic Inference in 65-nm CMOS," IEEE Transactions on Very Large Scale Integration (VLSI) Systems Year: 2016 | vol. 24, Issue: 3 | Journal Article | Publisher: IEEE.*

International Search Report and Written Opinion for application No. PCT/US2017/050132, dated Dec. 13, 2017.

* cited by examiner

US 10,755,242 B2

BITCOIN MINING HARDWARE ACCELERATOR WITH OPTIMIZED MESSAGE DIGEST AND MESSAGE SCHEDULER DATAPATH

TECHNICAL FIELD

The present disclosure pertains to the field of processors and, in particular, to a Bitcoin mining hardware accelerators.

BACKGROUND

Digital currency is an internet-based medium of exchange. Digital currency may be based on exchange rates for physical currency (e.g., the United States Dollar). Various types of digital currency exist, and may be used to buy physical goods and services from retailers that have agreed to accept the type of digital currency offered.

Bitcoin is the most popular type of (e.g., unit of) digital currency used in the digital currency eco-system. The Bitcoin transactional system is peer-to-peer, meaning transactions take place between users directly, without an intermediary (e.g., without involving a bank). Peer-to-peer Bitcoin transactions may be verified by network nodes and recorded in a public distributed ledger called a blockchain, which uses Bitcoin as its unit of accounting.

As opposed to physical currency systems backed on natural resources (e.g., gold), Bitcoins may be created by using software and hardware systems to solve a series of mathematical algorithms (e.g., Secure Hash Algorithm 256 (SHA-256)). When the Bitcoin mining algorithms are solved in a way that satisfies certain predefined conditions, a new block is added to the blockchain and a certain number of Bitcoins are awarded to the miner; thereby introducing new Bitcoins into the eco-system. Bitcoin mining algorithms are inherently difficult to solve, and thus require large amounts of processing power. Because of the large amount of power utilized, and the relatively high cost of that power, mining Bitcoins can be a very costly endeavor. In some embodiments, the cost to mine a single Bitcoin may exceed the value of the mined Bitcoin.

BRIEF DESCRIPTION OF THE DRAWINGS

Various embodiments of the present disclosure will be understood more fully from the detailed description given below and from the accompanying drawings of various embodiments of the disclosure. The drawings, however, should not be taken to limit the disclosure to the specific implementations, but are for explanation and understanding only.

DESCRIPTION OF EMBODIMENTS

Figure 1:
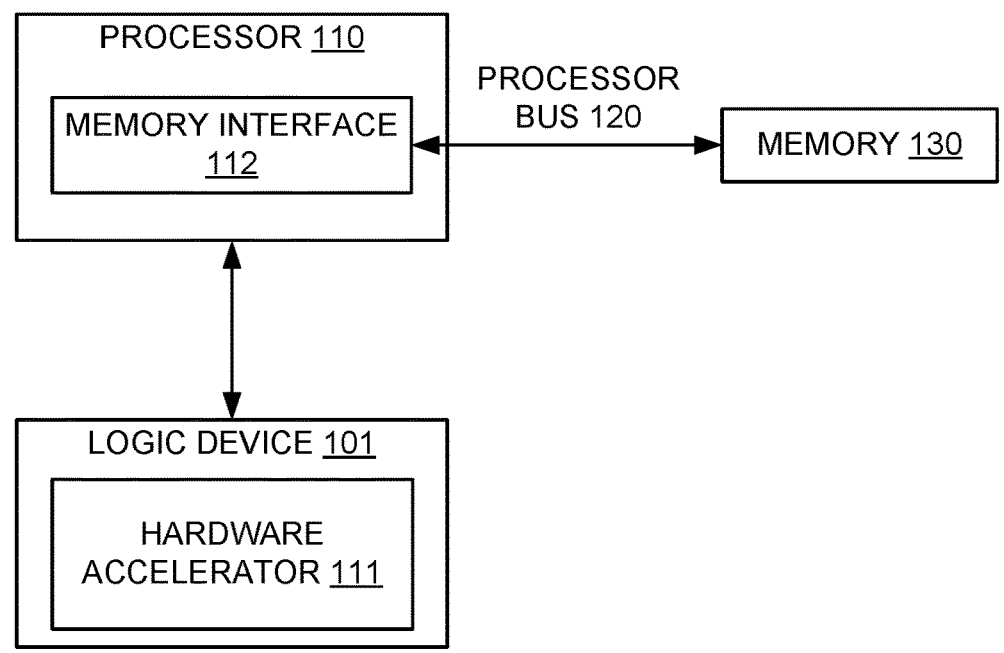
FIG. 1 is a block diagram illustrating a computing system that implements a hardware accelerator according to one embodiment.

The Bitcoin system may solve a critical issue of "double spending" (e.g., using the same credit over and over again) in digital currency by using the concept of block chaining, where a public ledger captures the transactions that occur in the digital currency system. New Bitcoins are created during the mining process that validates transactions and adds new blocks to the blockchain. This process of validating transactions and computing new blocks of the chain is known as Bitcoin mining. Bitcoin mining relies upon using brute force to repeatedly solve a series of SHA-256 hashing functions, and compare the result to a predefined threshold value. In one embodiment, if the output of the SHA-256 function is less than the threshold value, a new block is created and added to the blockchain. Because the software and hardware utilized in Bitcoin mining uses brute force to repeatedly and endlessly perform SHA-256 functions, the process of Bitcoin mining can be very power-intensive and utilize large amounts of hardware space. The embodiments described herein optimize Bitcoin mining operations by reducing the space utilized and power consumed by Bitcoin mining hardware.

The Bitcoin mining operation may consist of two stages of Secure Hash Algorithm 256 (SHA-256) hashing to compress a 1024-bit message, followed by another round of SHA-256 hashing of the intermediate hash. The 1024-bit message consists of a 32-bit nonce that may be incremented every cycle. A valid nonce may be found if the final hash is less than a predefined threshold value. This may be verified by checking if the final hash contains a predefined number of leading zeros. The challenge for miners is to search through the entire nonce space in a brute force manner while minimizing energy consumption per hash and maximizing performance per watt.

The most expensive operation in mining may involve the computationally intensive task of finding the 32-bit nonce (e.g., a 32-bit (4-byte) field whose value is set so that the hash of the block will contain a run of zeros), which when appended to the Merkle root (e.g., a hash of the transaction hashes in the blockchain), previous hash and other headers, produces a 256-bit hash value, which is less than a predefined threshold value. A typical SHA-256 datapath consists of two major computational blocks—a message digest and a message scheduler with SHA-256 specific functions that combine multiple 32-bit words followed by 32-bit additions. The performance of the fully unrolled datapath is limited by these two datapaths. This hashing operation may be the largest recurring cost a miner incurs in the process of creating a Bitcoin and therefore there is a strong motivation to reduce the energy consumption of this process.

The embodiments described herein may address computationally expensive Bitcoin mining limitations by describing a Bitcoin mining hardware accelerator with optimized SHA-256 message digest and message scheduler datapaths. The message digest datapath optimizations may include (i) WH-Look Ahead and (ii) Pre-addition of 'D', each resulting in a possible 18% improvement in the critical path of new 'E' computation, and (iii) 2-cycle Deferred 'A' possibly resulting in 31.5% improvement in the critical path of new 'A' computations. These optimizations may result in a 15% combinational area and 35% combinational power improvement in the message digest logic. The optimizations in message scheduler datapath may include 3-cycle and 6-cycle distributed message expansion techniques possibly resulting in 37% and 43% improvement in critical paths, respectively.

The operations described herein are described with respect to Application Specific Integrated Circuit (ASIC) implementations for convenience. In other embodiments, any other logic device may be used, including, but not limited to Processors, SoCs, and FPGA platforms. In one embodiment, SHA-256 implementations have pipeline boundaries exactly at the end of each round computation. Since Bitcoin mining utilizes the final hash value at the end of 120 rounds, the logic in SHA-256 rounds can be redistributed across pipeline stages to reduce the critical path. Optimizing the critical paths in the computation intensive message digest and scheduler datapaths may result in extra time, which can be used to reduce switching capacitance or scale the supply voltage. Both of these optimizations may reduce the overall energy utilized per hash. Furthermore, it should be noted that although the operations and embodiments herein are described with respect to Bitcoin mining, they are generally applicable to all hashing functions (e.g., SHA-256).

FIG. 1 is a block diagram illustrating a computing system that implements a Bitcoin mining hardware accelerator according to one embodiment. The computing system 100 is formed with a processor 110 that includes a memory interface 112. The computing system 100 may be any device or combination of devices, but the description of various embodiments described herein is directed to processing devices and programmable logic devices.

System 100 includes a memory interface 112 and memory 130. In one embodiment, memory interface 112 may be a bus protocol for communication from processor 110 to memory 130. Memory 130 includes a dynamic random access memory (DRAM) device, a static random access memory (SRAM) device, flash memory device, or other memory device. Memory 130 stores instructions and/or data represented by data signals that are to be executed by the processor 110. The processor 110 is coupled to the memory 130 via a processor bus 120. A system logic chip, such as a memory controller hub (MCH) may be coupled to the processor bus 120 and memory 130. An MCH can provide a high bandwidth memory path to memory 130 for instruction and data storage and for storage of graphics commands, data and textures. The MCH can be used to direct data signals between the processor 110, memory 130, and other components in the system 100 and to bridge the data signals between processor bus 120, memory 130, and system I/O, for example. The MCH may be coupled to memory 130 through a memory interface (e.g., memory interface 112). In some embodiments, the system logic chip can provide a graphics port for coupling to a graphics controller through an Accelerated Graphics Port (AGP) interconnect. The system 100 may also include an I/O controller hub (ICH). The ICH can provide direct connections to some I/O devices via a local I/O bus. The local I/O bus is a high-speed I/O bus for connecting peripherals to the memory 130, chipset, and processor 110. Some examples are the audio controller, firmware hub (flash BIOS), wireless transceiver, data storage, legacy I/O controller containing user input and keyboard interfaces, a serial expansion port such as Universal Serial Bus (USB), and a network controller. The data storage device can include a hard disk drive, a floppy disk drive, a CD-ROM device, a flash memory device, or other mass storage device.

System 100 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, system 100 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present disclosure are not limited to any specific combination of hardware circuitry and software.

Embodiments described herein are not limited to computer systems. Alternative embodiments of the present disclosure can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

Processor 110 may include one or more execution units. One embodiment may be described in the context of a single processor desktop or server system, but alternative embodiments may be included in a multiprocessor system. System 100 may be an example of a 'hub' system architecture. The computer system 100 includes a processor 110 to process data signals. The processor 110, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 110 is coupled to a processor bus 120 that transmits data signals between the processor 110 and other components in the system 100. Other elements of system 100 may include a graphics accelerator, memory controller hub, I/O controller hub, wireless transceiver, Flash BIOS, Network controller, Audio controller, Serial expansion port, I/O controller, etc.

In one embodiment, the processor 110 includes a Level 1 (L1) internal cache memory. Depending on the architecture, the processor 110 may have a single internal cache or multiple levels of internal caches. Other embodiments include a combination of both internal and external caches depending on the particular implementation and needs.

For another embodiment of a system, a Bitcoin mining hardware accelerator may be included on a system on a chip (SoC). One embodiment of a SoC includes of a processor and a memory. The memory of the SoC may be a flash memory. The flash memory can be located on the same die as the processor and other system components. Additionally, other logic blocks such as a memory controller or graphics controller can also be located on a SoC.

System 100 includes a logic device (LD) 101 operatively coupled to the processor 110. LD may be a programmable logic device (PLD) or a non-programmable logic device. In one embodiment, LD 101 may be a field-programmable gate array (FPGA). In other embodiments, LD 101 may be an Application Specific Integrated Circuit (ASIC), complex programmable logic device, Generic array logic, programmable logic array, or other type of LD. In one embodiment, processor 110 and LD 101 may be included on a single circuit board, each in their respective locations.

LD 101 is an integrated circuit used to build reconfigurable and/or non-reconfigurable digital circuits. The LD 101 can be an electronic component used in connection with other components or other integrated circuits, such as processor 110. In general, PLDs can have undefined functions at the time of manufacturing and can be programmed or reconfigured before use. The LD 101 can be a combination of a logic device and a memory device. The memory of the LD 101 can store a pattern that was given to the integrated circuit during programming. Data can be stored in the integrated circuit using various technologies, such as antifuses, Static Random Access Memory (SRAM), EPROM cells, EEPROM cells, flash memory, or the like. The LD 101 can use any type of logic device technology.

In one embodiment, LD 101 includes hardware accelerator 111 to perform the optimized digital currency mining operations described herein. In one embodiment, hardware accelerator 111 is a Bitcoin mining hardware accelerator—described in further detail with respect to FIGS. 2-16.

Figure 2:
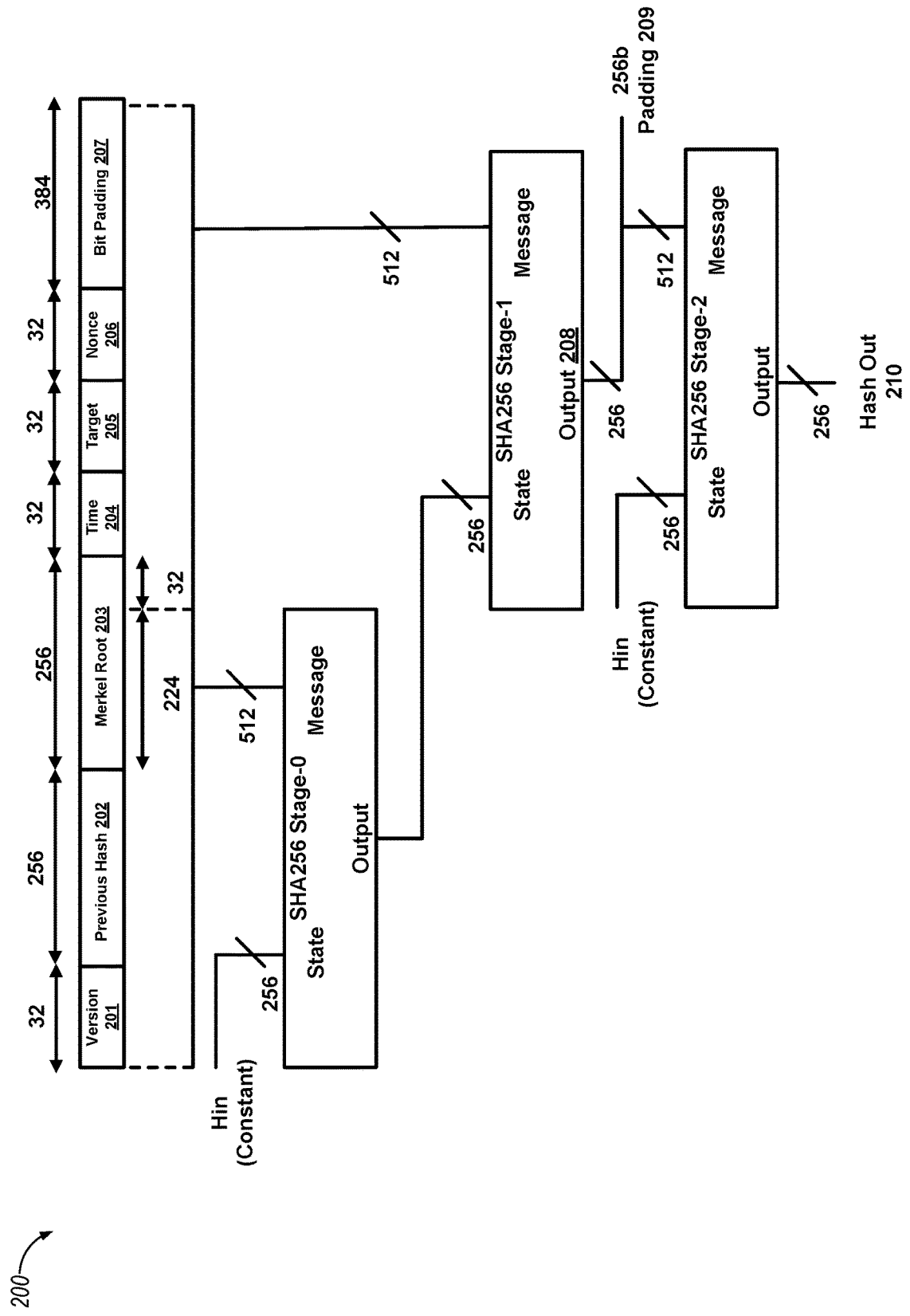
FIG. 2 is a block diagram illustrating a Bitcoin mining hardware accelerator according to one embodiment.

FIG. 2 is a block diagram illustrating a Bitcoin mining hardware accelerator according to one embodiment. In one embodiment, the Bitcoin mining process starts with a 1024-bit message consisting of a 32-bit version 201, 256-bit hash 202 from the previous block, 256-bit Merkle root 203 of the transaction, 32-bit time stamp 204, 32-bit target value 205, 32-bit nonce 206 and a 384-bit padding 207. The 1024-bit message is compressed using two stages of 64-round SHA-256 to generate a 256 bit hash 208. This is padded with a 256-bit constant 209 and is compressed again to obtain the final 256-bit hash 210.

The process of mining may involve identifying a nonce for a given header, which generates a final hash that is less than a pre-defined target value. This may be achieved by looking for a minimum number of leading zeros that would ensure the hash to be smaller than the target. The target, and hence the leading zero requirement, may change depending on the rate of new block creation to maintain the rate at approximately one block every ten minutes. Decreasing the target may decrease the probability of finding a valid hash and hence increase the overall search space to generate a new block for the chain. In one embodiment, for a given header, the Bitcoin mining hardware accelerator traverses the search space of $2^{32}$ options to potentially find a valid nonce. If no valid nonce is found, the Merkle root may be changed by choosing a different set of pending transactions and starting over with the nonce search. The three stages of hashing may be implemented as fully unrolled 64 rounds of SHA256 message digest and parallel message expansion logic. The computation intensive SHA-256 hashing may be the major contributor to the energy consumption in a Bitcoin mining accelerator.

Figure 3:
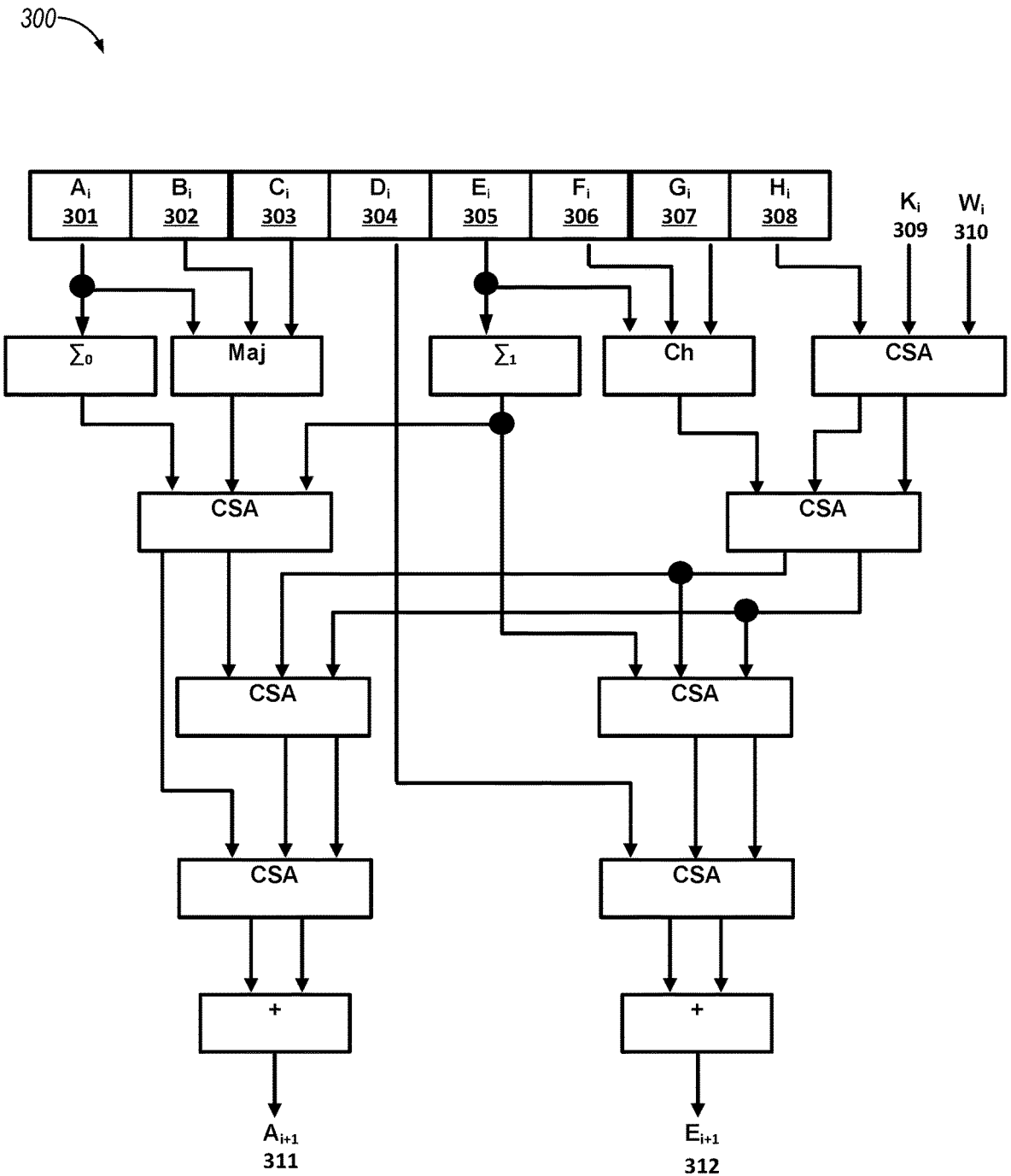
FIG. 3 is a block diagram illustrating a SHA-256 message digest round datapath according to one embodiment.

FIG. 3 is a block diagram illustrating a SHA-256 message digest round datapath 300 according to one embodiment. Each round in the single SHA-256 message digest may combine eight 32-bit words known as states $A_i$ through $H_i$ (301-308) along with a 32-bit message, $W_i$ 310, and a 32-bit round constant, $K_i$ 309, to generate two new 32-bit states $A_{i+1}$ (311) and $E_{i+1}$ (312). The new states $B_{i+1}$ through $D_{i+1}$ may be equal to $A_i$ through $C_i$, and $F_{i+1}$ through $H_{i+1}$ may be equal to $E_i$ through $G_i$. The critical path for both $A_{i+1}$ and $E_{i+1}$ may be identical and may include four Carry Save Adders (CSA) followed by a Completion Adder (CA). This may equate to approximately 19 logic gate levels, as shown in FIG. 3.

Figure 4:
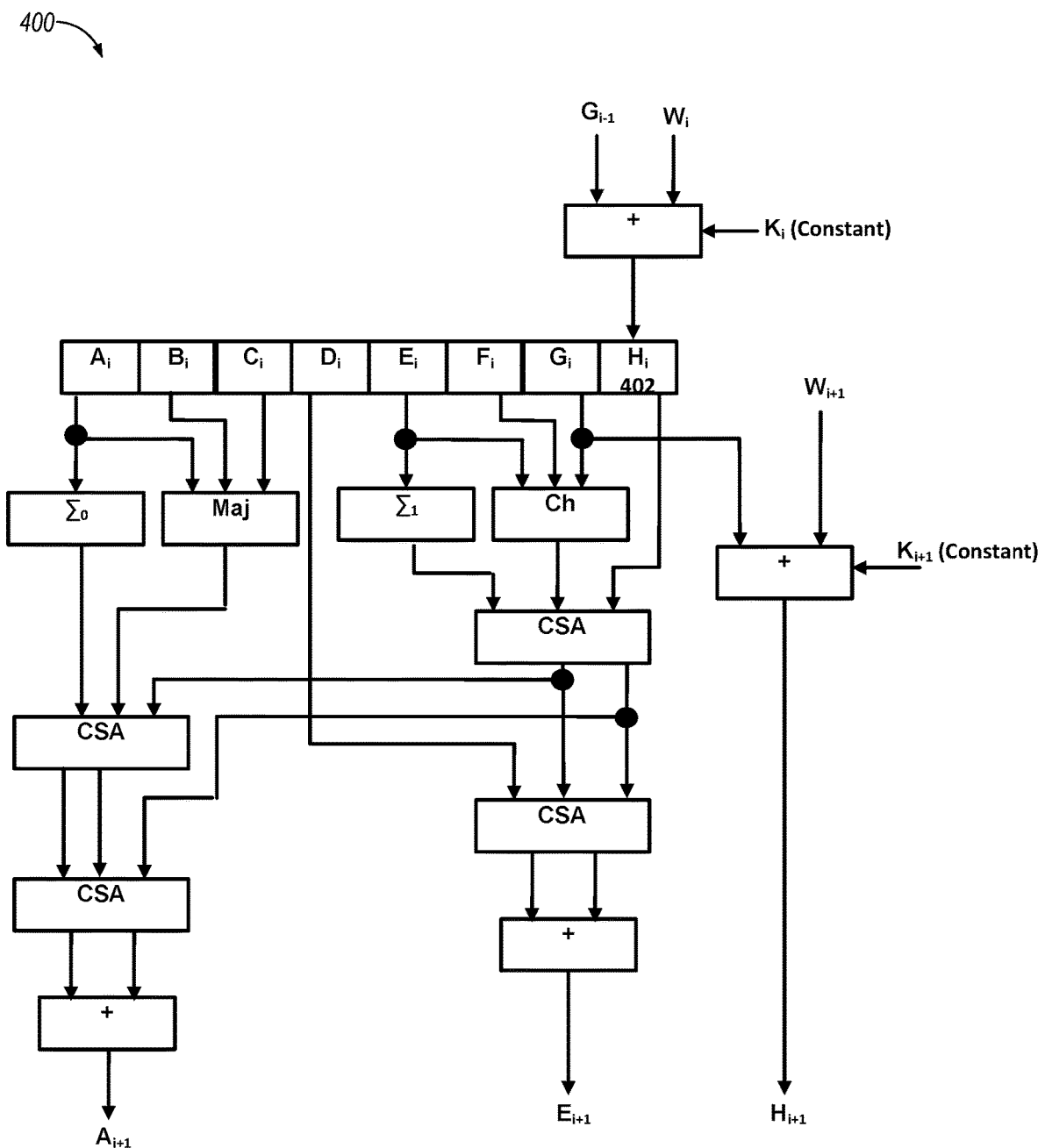
FIG. 4 is a block diagram illustrating a SHA-256 message digest datapath with WH-LookAhead according to one embodiment.

FIG. 4 is a block diagram illustrating a SHA-256 message digest datapath with WH-LookAhead according to one embodiment. In one embodiment, $$T1_i = \Sigma_1(E_i) + Ch(E_i, F_i, G_i) + H_i + K_i + W_i$$

$$T2_i = \Sigma_0(A_i) + Maj(A_i, B_i, C_i)$$

$$E_{i+1} = D_i + T1_i,$$

$$A_{i+1} = T1_i + T2_i$$

In one embodiment, the sum of $(H_i + K_i + W_i)$ may be pre-computed to reduce addition in the critical path. H may be a shifted version of G (e.g., $H_i = G_{i-1}$). Therefore, with WH-LookAhead, in one embodiment, $$T1_i = \Sigma_1(E_i) + Ch(E_i, F_i, G_i) + H'_i \text{ where } H'_i = G_{i-1} + K_i + W_i$$

$$T2_i = \Sigma_0(A_i) + Maj(A_i, B_i, C_i)$$

$$E_{i+1} = D_i + T1_i,$$

$$A_{i+1} = T1_i + T2_i$$

The precomputed $(H_i + K_i + W_i)$ may be stored in the 32-bit register 402 dedicated for $H_i$. This optimization reduces the critical path for the computation of $E_{i+1}$ by one CSA or approximately three logic gates. A similar addition for the next round may be performed in parallel using an additional adder to add $(G_i + K_i + W_i)$, as shown in FIG. 4.

Figure 5:
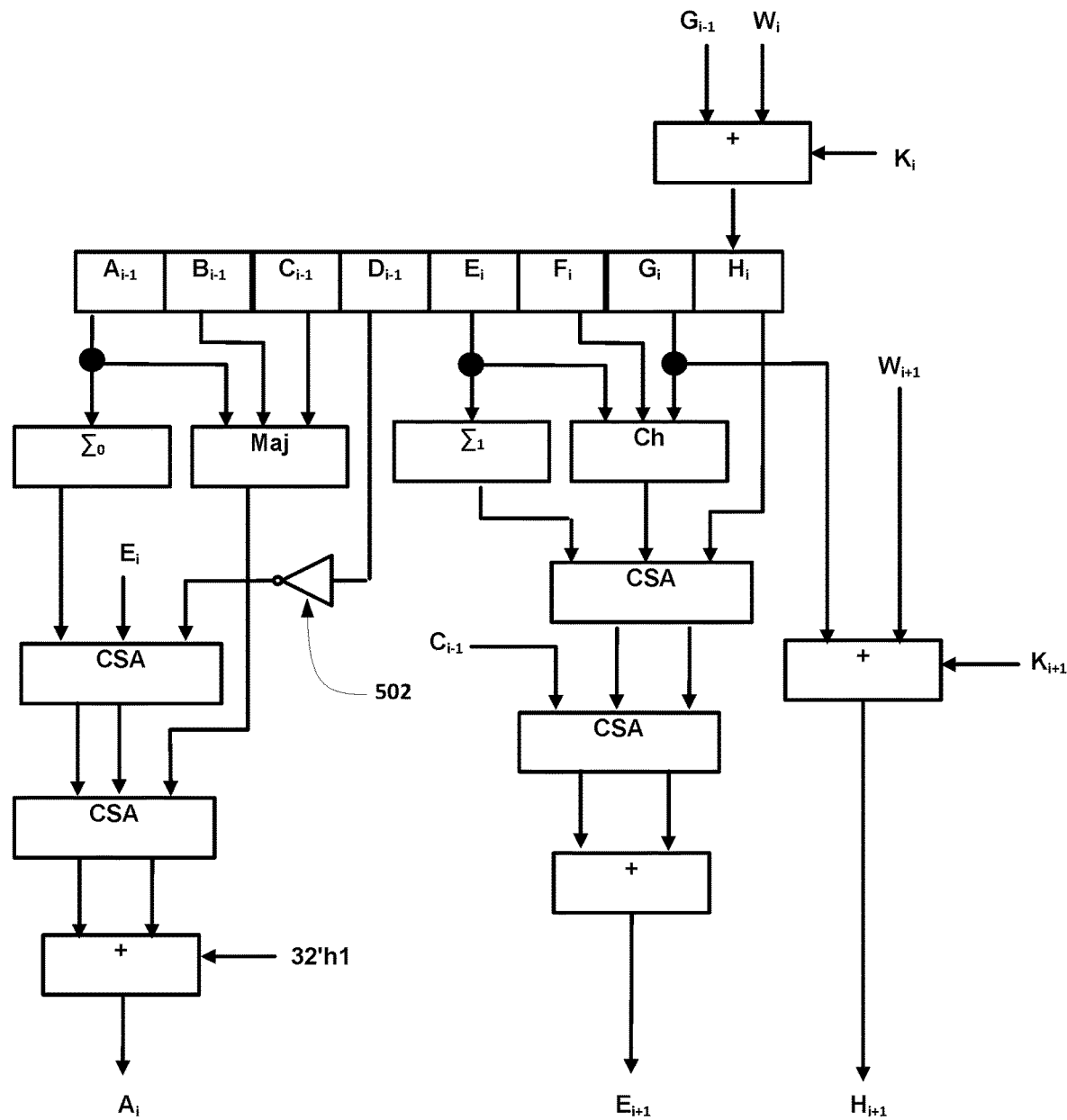
FIG. 5 is a block diagram illustrating a SHA-256 message digest datapath with 1-cycle deferred 'A' according to one embodiment.

FIG. 5 is a block diagram illustrating a SHA-256 message digest datapath with 1-cycle deferred 'A' according to one embodiment. In one embodiment for the computation of $A_{i+1}$, $$T1_i \Sigma_1(E_i) + Ch(E_i, F_i, G_i) + H'_i$$

$$T2_i = \Sigma_0(A_i) + Maj(A_i, B_i, C_i)$$

$$E_{i+1} = D_i + T1_i$$

$$A_{i+1} = T1_i + T2_i = T2_i - D_i + E_{i+1}$$

The computation of $A_{i+1}$ may depend on $T1_i$, which may also be used in the computation of $E_{i+1}$. If the computation of $A_{i+1}$ is deferred by one cycle, the computation of $T1_i$ can be removed from the critical path, as shown:

$$T1_i = \Sigma_1(E_i) + Ch(E_i, F_i, G_i) + H'_i$$

$$T2_{i-1} = \Sigma_0(A_{i-1}) + Maj(A_{i-1}, B_{i-1}, C_{i-1})$$

$$E_{i+1} = C_{i-1} + T1_i$$

$$A_i = T2_{i-1} - D_{i-1} + E_i$$

The subtraction of 'D' may be achieved by adding the complement (~D) 502 and then setting the carry-in of the completion adder to 1'b1. Deferring the computation of 'A' by one cycle may reduce the critical path for the computation of $A_i$ (or $A_{i+1}$) by one CSA. The critical path for computation of a new state A or E may be reduced to 16 logic gates, a 15% reduction in the critical path compared to an alternative embodiment, as shown in FIG. 5. Deferring the computation may increase the overall SHA256 latency by one cycle. This may result in a negligible 0.8% increase in latency in a fully unrolled 120-round design with no impact on the Bitcoin mining throughput.

Figure 6:
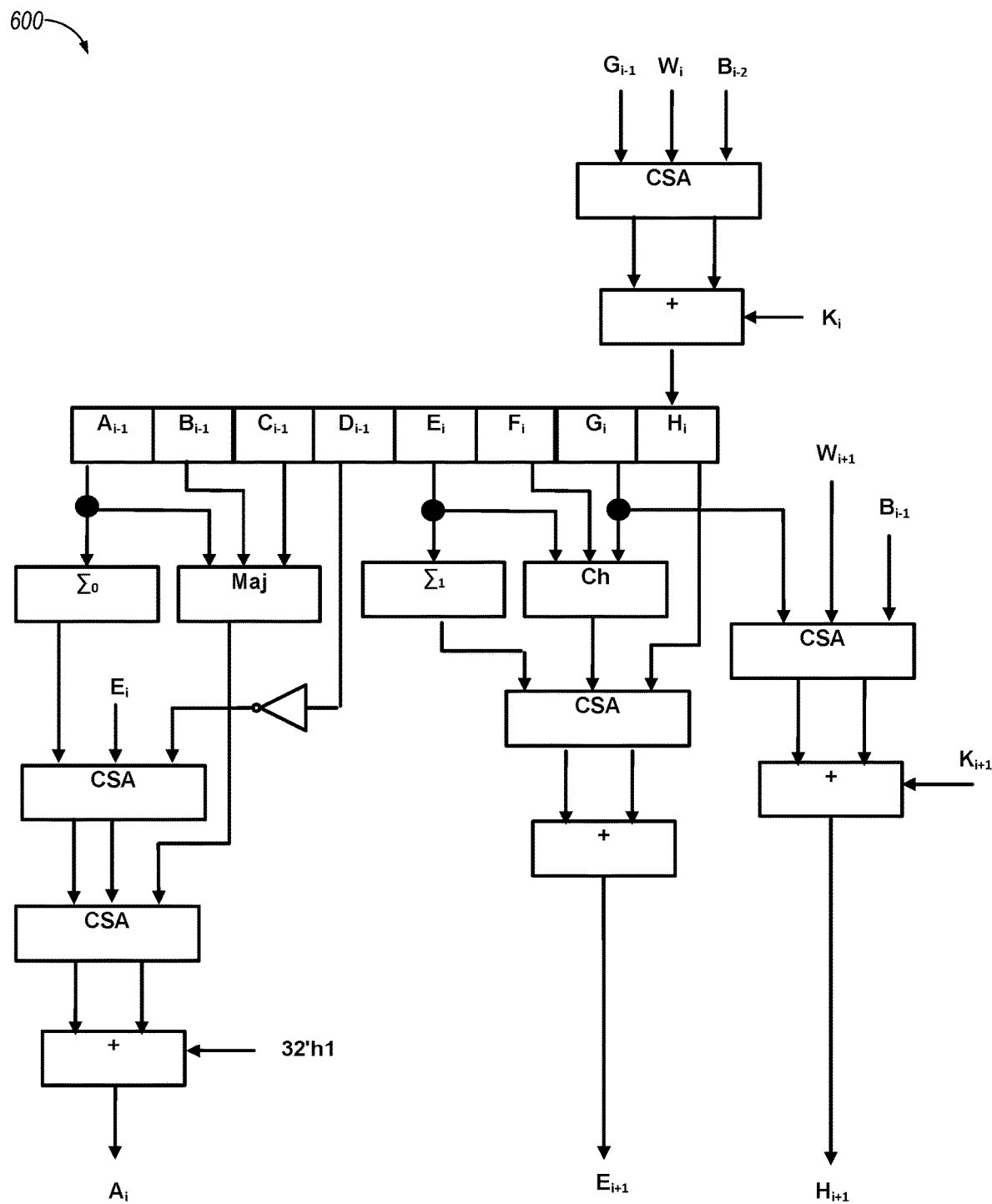
FIG. 6 is a block diagram illustrating a SHA-256 message digest datapath with pre-addition of 'D' according to one embodiment.

FIG. 6 is a block diagram illustrating a SHA-256 message digest datapath with pre-addition of 'D' according to one embodiment. In the computation of $E_{i+1}$ the state $D_i$ (or $C_{i-1}$) may be added to the intermediate term $T1_i$, as shown:

$$T1_i = \Sigma_1(E_i) + Ch(E_i, F_i, G_i) + H'_i$$

$$E_{i+1} = C_{i-1} + T1_i$$

$$T2_{i-1} = \Sigma_0(A_i) + Maj(A_{i-1}, B_{i-1}, C_{i-1})$$

$$A_i = T2_{i-1} - D_{i-1} + E_i$$

Since $C_{i-1}$ is equal to $B_{i-2}$, the addition of state 'D' can be moved to the precomputation stage of $H'_i$, as shown:

$$E_{i+1} = \Sigma_1(E_i) + Ch(E_i, F_i, G_i) + H''_i \text{ where } H''_i = G_{i-1} + K_i + W_i + B_{i-2}$$

$$T2_{i-1} = \Sigma_0(A_i) + Maj(A_{i-1}, B_{i-1}, C_{i-1})$$

$$A_i = T2_{i-1} - D_{i-1} + E_i$$

This may reduce a CSA in the critical path of the $E_{i+1}$ computation. The pre-addition of state 'D' may reduce the critical path of $E_{i+1}$ to 13 logic gates (e.g., a possible 31% improvement compared to an alternative design), as shown in FIG. 6.

Figure 7:
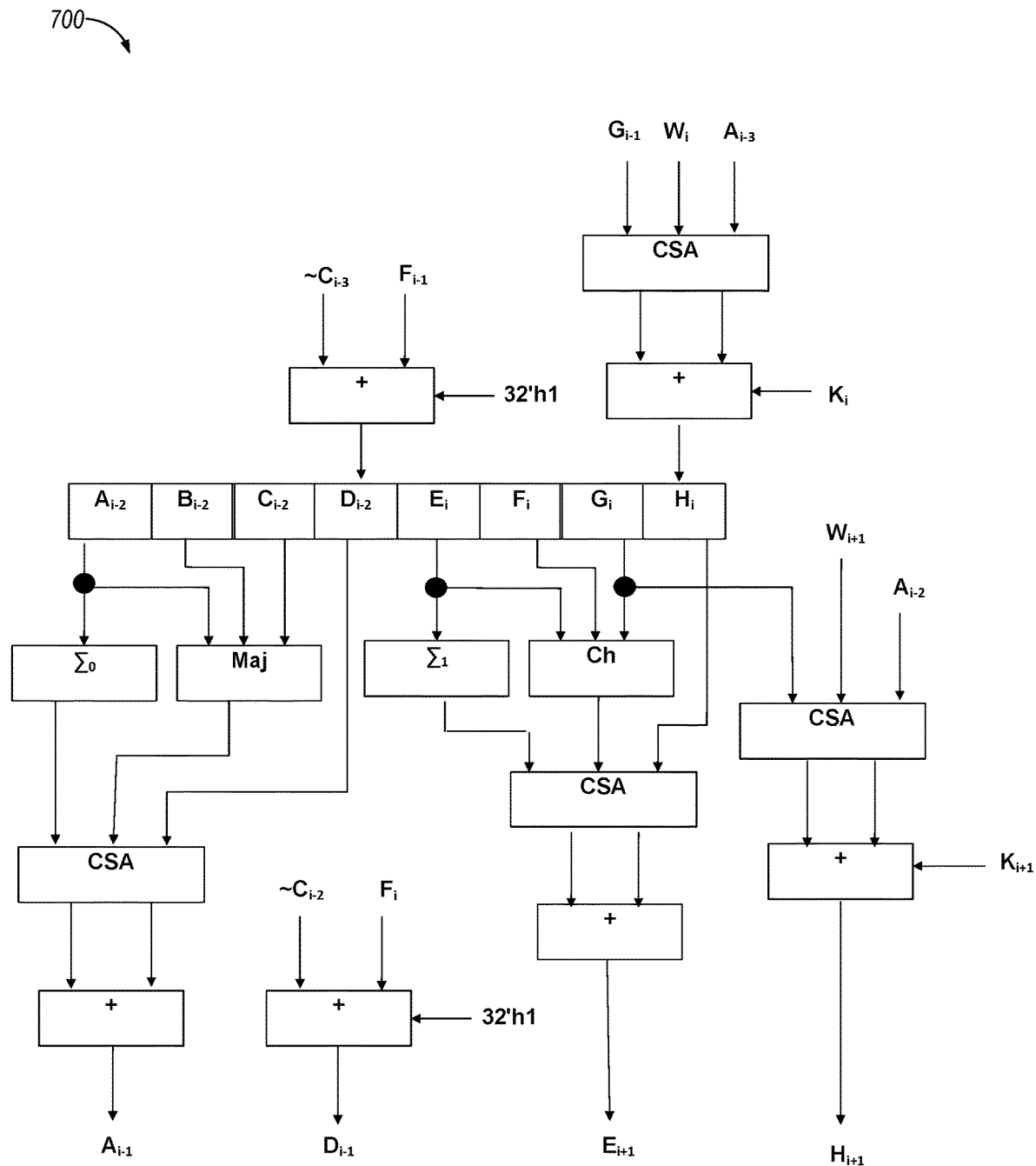
FIG. 7 is a block diagram illustrating a SHA256 message digest datapath with 2-cycle deferred 'A' according to one embodiment.

FIG. 7 is a block diagram illustrating a SHA256 message digest datapath with 2-cycle deferred 'A' according to one embodiment. The computation of $A_i$ from the previous optimizations may make use of the addition of $E_i$ and subtraction of $D_{i-1}$, as shown:

$$E_{i+1} = \Sigma_1(E_i) + Ch(E_i, F_i, G_i) + H''_i$$

$$T2_{i-1} = \Sigma_0(A_i) + Maj(A_{i-1}, B_{i-1}, C_{i-1})$$

$$A_i = T2_{i-1} - D_{i-1} + E_i$$

If the computation of $A_i$ is deferred by an additional cycle, $E_i - D_{i-1}$ may be precomputed to remove a CSA in the critical path of new 'A' computation:

$$E_{i+1} = \Sigma_1(E_i) + Ch(E_i, F_i, G_i) + H''_i, \text{ where } H''_i = G_{i-1} + K_i + W_i + A_{i-3}$$

$$T2_{i-2} = \Sigma_0(A_{i-2}) + Maj(A_{i-2}, B_{i-2}, C_{i-2})$$

$$A_i = T2_{i-2} - D'_{i-2} \text{ where } D'_{i-2} = C_{i-3} + F_{i-1}$$

The 2-cycle delay in the 'A' computation may result in an overall critical path of 13 logic gates for the computation of new states 'A' and 'E', as shown in FIG. 7.

Figure 8A:
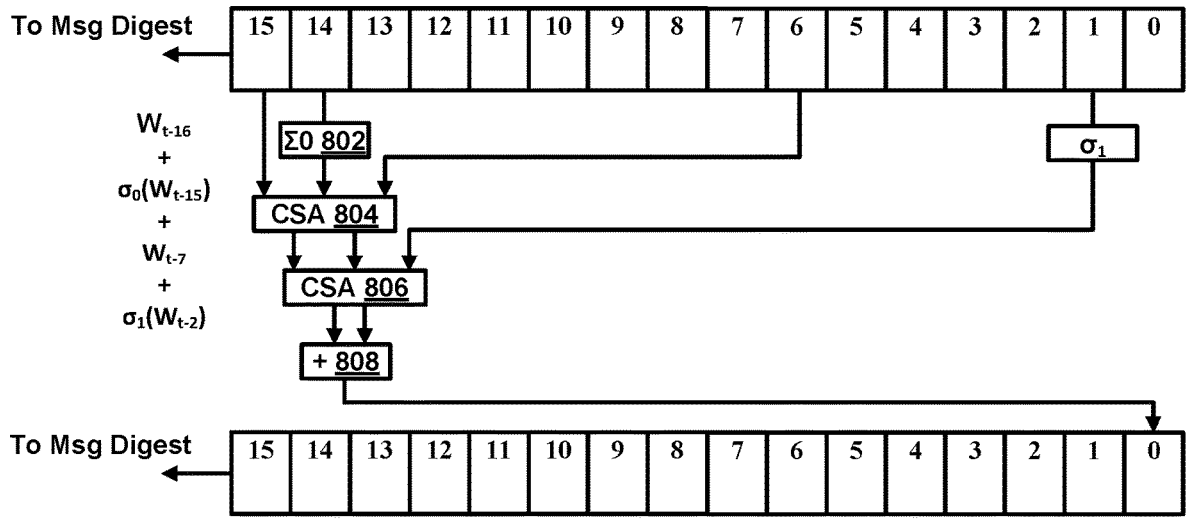
FIG. 8A is a block diagram illustrating a message scheduler datapath according to one embodiment.

FIG. 8A is a block diagram illustrating a message scheduler datapath according to one embodiment. In one embodiment, the 512-bit message input to SHA-256 is consumed by the message digest logic across the first 16 rounds in the form of 32-bit words. For the remaining 48 rounds, the message scheduler logic may combine the input message to generate a new 32-bit message word each round. In one embodiment, the datapath for a single round of message expansion logic is shown in FIG. 8a. The critical path in the message expansion datapath may include a sigma-function 802, two CSA 804, 806, and a CA 808. This results in a critical path of 16 logic gates, as shown in FIG. 8A.

Figure 8B:
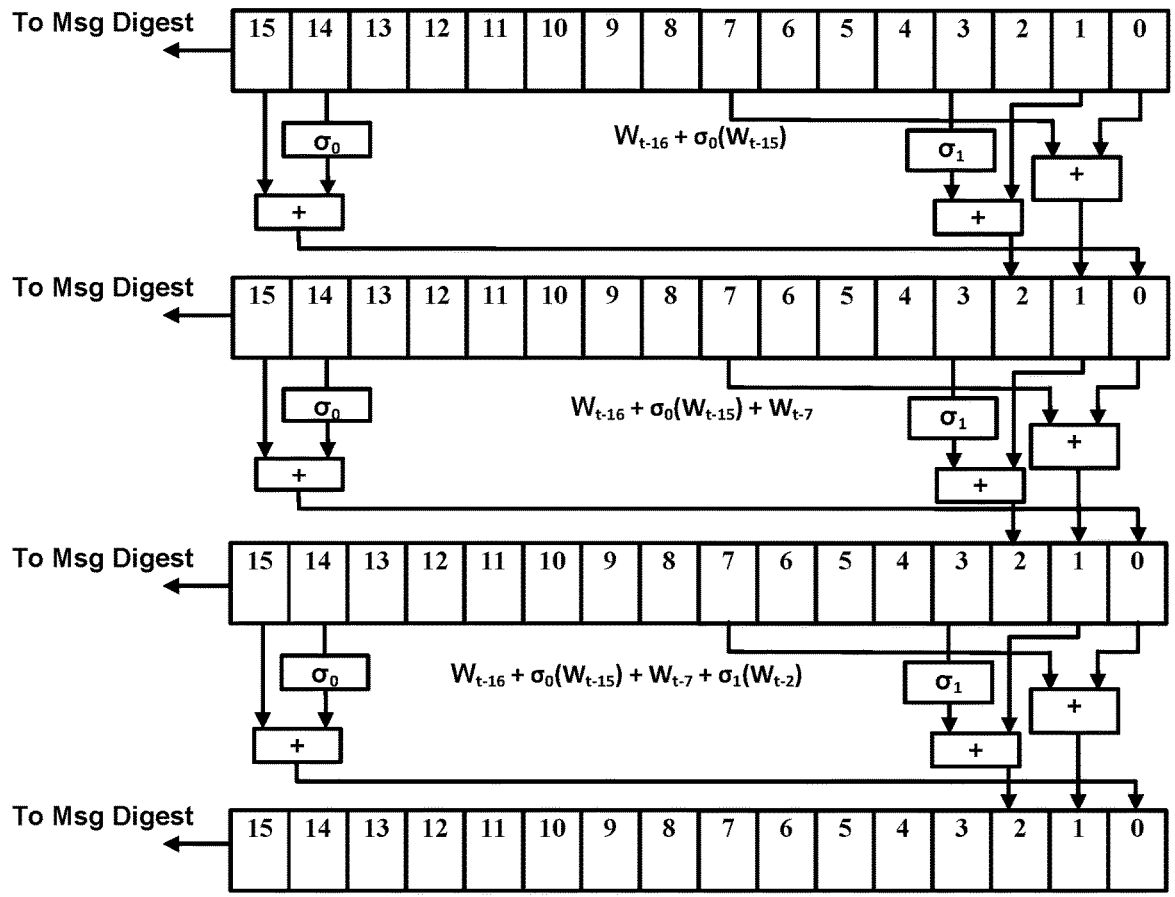
FIG. 8B is a block diagram illustrating a 3-cycle distributed message expansion according to one embodiment.

FIG. 8B is a block diagram illustrating a 3-cycle distributed message expansion according to one embodiment. In one embodiment, the new 32-bit message generated in each round (or cycle) is not consumed by the message digest logic for the subsequent 15 rounds. As a result, the computation of a new message word may be distributed across multiple rounds (or cycles) to reduce the critical path. The 3-cycle distributed message expansion datapath is shown in FIG. 8B. Each of the three additions in the message expansion logic is distributed across three rounds, thereby limiting the critical path of each round to a maximum of one sigma-function and a CA. This may be equivalent to 10 logic gates, a possible 37% improvement in the critical path compared to alternative implementations. Since the computation of a $W_i$ utilizes $\sigma_1$ ($W_{t-2}$), the completion of each new message computation may be delayed by 3-cycles.

Figure 9:
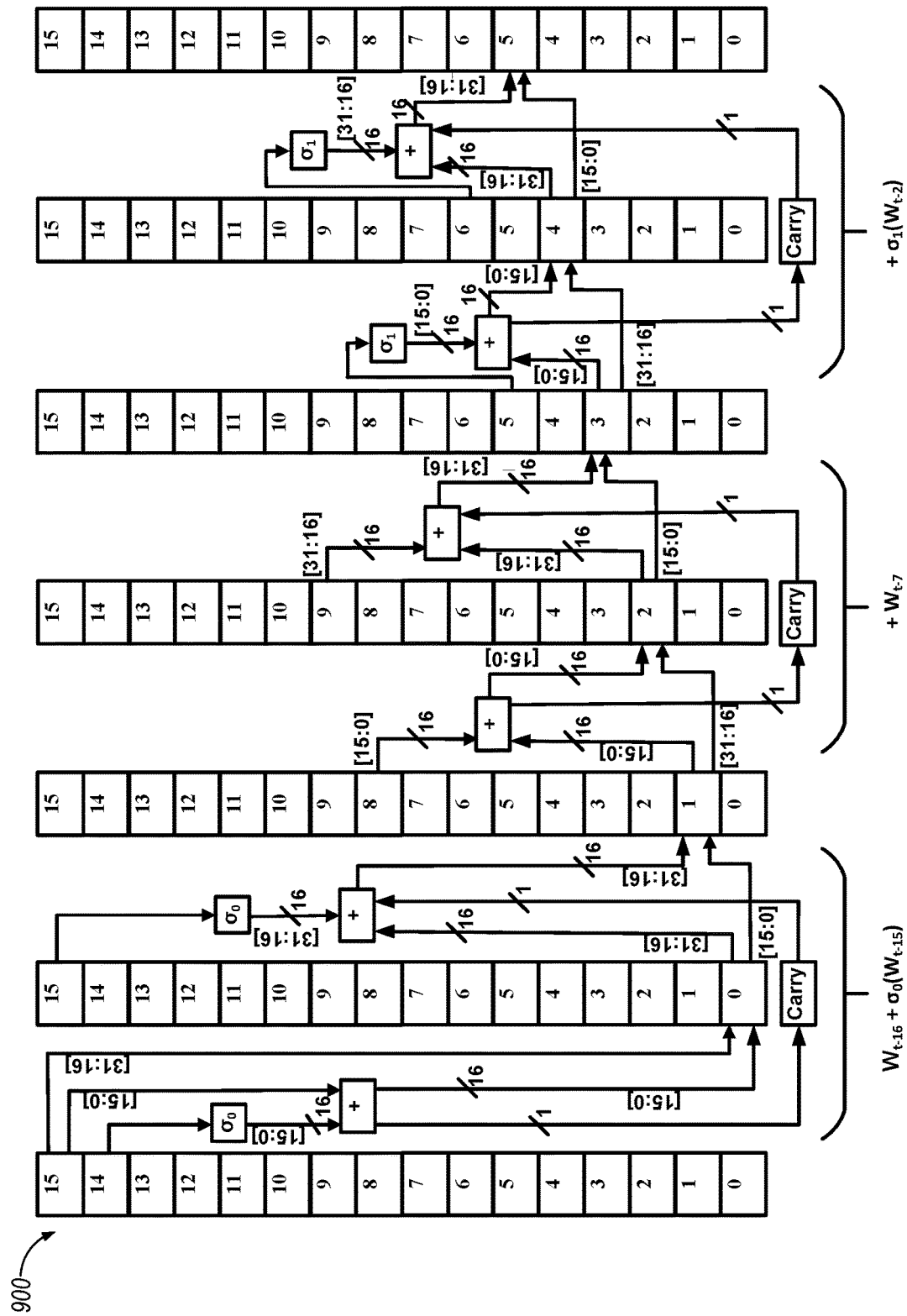
FIG. 9 is a block diagram illustrating a 6-cycle distributed message expansion according to one embodiment.

FIG. 9 is a block diagram illustrating a 6-cycle distributed message expansion according to one embodiment. The critical path in the 3-cycle distributed message expansion may include the completion adder. In one embodiment, the 32-bit complete addition can be distributed across two rounds to obtain a 6-cycle distributed message expansion datapath, as shown in FIG. 9. The 32-bit addition in each round may be replaced by a 16-bit addition, reducing the critical path by at least 1 logic gate. The 6-cycle distributed message expansion may have a critical path of 9 logic gates, resulting in ~44% improvement in critical path compared to an alternative embodiment.

Since the message digest datapath may limit the ability to increase operating frequency, the extra timing slack in the message scheduler logic can be converted to energy reduction by operating the 120 rounds of message expansion logic at a scaled voltage.

Figure 10A:
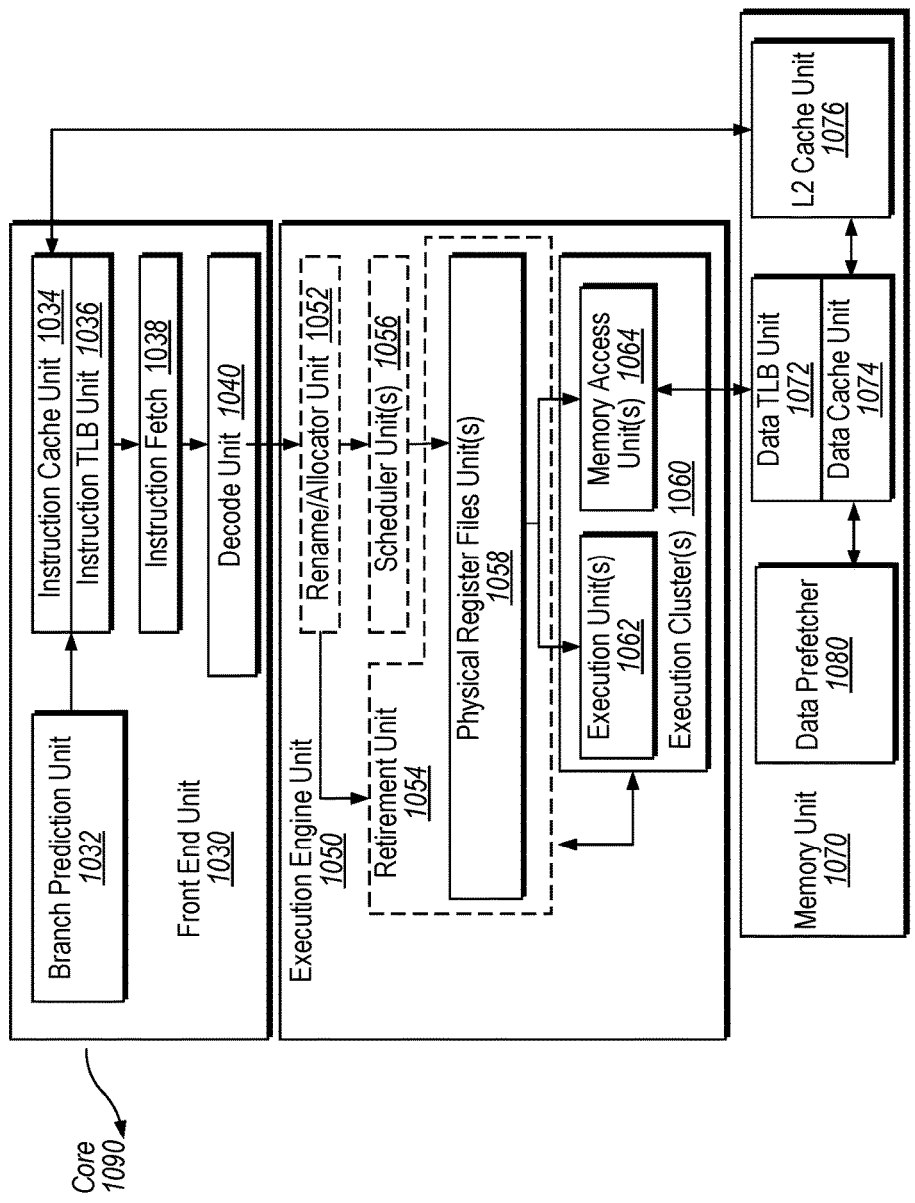
FIG. 10A is a block diagram illustrating a micro-architecture for a processor that implements Bitcoin mining operations according to one embodiment.

FIG. 10A is a block diagram illustrating a micro-architecture for a processor 1000 that implements Bitcoin mining hardware accelerator operations, according to one embodiment. Specifically, processor 1000 depicts an in-order architecture core and a register renaming logic, out-of-order issue/execution logic to be included in a processor according to at least one embodiment of the disclosure. The embodiments of the Bitcoin mining hardware accelerator operations described herein can be implemented in processor 1000.

Processor 1000 includes a front end unit 1030 coupled to an execution engine unit 1050, and both are coupled to a memory unit 1070. The processor 1000 may include a reduced instruction set computing (RISC) core, a complex instruction set computing (CISC) core, a very long instruction word (VLIW) core, or a hybrid or alternative core type. As yet another option, processor 1000 may include a special-purpose core, such as, for example, a network or communication core, compression engine, graphics core, or the like.

In one embodiment, processor 1000 may be a multi-core processor or may be part of a multiprocessor system.

The front end unit 1030 includes a branch prediction unit 1032 coupled to an instruction cache unit 1034, which is coupled to an instruction translation lookaside buffer (TLB) 1036, which is coupled to an instruction fetch unit 1038, which is coupled to a decode unit 1040. The decode unit 1040 (also known as a decoder) may decode instructions and generate as an output one or more micro-operations, microcode entry points, microinstructions, other instructions, or other control signals, which are decoded from, or which otherwise reflect, or are derived from, the original instructions. The decoder 1040 may be implemented using various different mechanisms. Examples of suitable mechanisms include, but are not limited to, look-up tables, hardware implementations, programmable logic arrays (PLAs), microcode read only memories (ROMs), etc. The instruction cache unit 1034 is further coupled to the memory unit 1070. The decode unit 1040 is coupled to a rename/allocator unit 1052 in the execution engine unit 1050.

The execution engine unit 1050 includes the rename/allocator unit 1052 coupled to a retirement unit 1054 and a set of one or more scheduler unit(s) 1056. The scheduler unit(s) 1056 represents any number of different schedulers, including reservations stations (RS), central instruction window, etc. The scheduler unit(s) 1056 is coupled to the physical register file(s) unit(s) 1058. Each of the physical register file(s) units 1058 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 1058 is overlapped by the retirement unit 1054 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 1054 and the physical register file(s) unit(s) 1058 are coupled to the execution cluster(s) 1060. The execution cluster(s) 1060 includes a set of one or more execution units 1062 and a set of one or more memory access units 1064. The execution units 1062 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 1056, physical register file(s) unit(s) 1058, and execution cluster(s) 1060 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1064). It should also be understood that where separate pipelines are used, one or more of these pipelines may be out-of-order issue/execution and the rest in-order.

The set of memory access units 1064 is coupled to the memory unit 1070, which may include a data prefetcher 1080, a data TLB unit 1072, a data cache unit (DCU) 1074, and a level 2 (L2) cache unit 1076, to name a few examples. In some embodiments DCU 1074 is also known as a first level data cache (L1 cache). The DCU 1074 may handle multiple outstanding cache misses and continue to service incoming stores and loads. It also supports maintaining cache coherency. The data TLB unit 1072 is a cache used to improve virtual address translation speed by mapping virtual and physical address spaces. In one exemplary embodiment, the memory access units 1064 may include a load unit, a store address unit, and a store data unit, each of which is coupled to the data TLB unit 1072 in the memory unit 1070. The L2 cache unit 1076 may be coupled to one or more other levels of cache and eventually to a main memory.

In one embodiment, the data prefetcher 1080 speculatively loads/prefetches data to the DCU 1074 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 1000 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 10B:
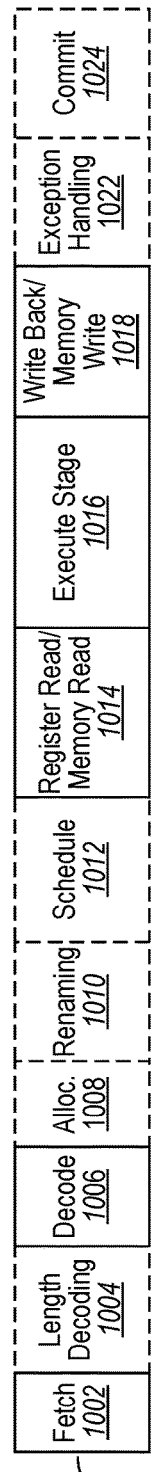
FIG. 10B is a block diagram illustrating an in-order pipeline and a register renaming stage, out-of-order issue/execution pipeline according to one embodiment.

FIG. 10B is a block diagram illustrating an in-order pipeline and a register renaming stage, out-of-order issue/execution pipeline implemented by processor 1000 of FIG. 10A according to some embodiments of the disclosure. The solid lined boxes in FIG. 10B illustrate an in-order pipeline, while the solid lined boxes in combination with the dashed lined boxes illustrate a register renaming, out-of-order issue/execution pipeline. In FIG. 10B, a processor pipeline 1001 includes a fetch stage 1002, a length decode stage 1004, a decode stage 1006, an allocation stage 1008, a renaming stage 1010, a scheduling (also known as a dispatch or issue) stage 1012, a register read/memory read stage 1014, an execute stage 1016, a write back/memory write stage 1018, an exception handling stage 1022, and a commit stage 1024. In some embodiments, the ordering of stages 1002-1024 may be different than illustrated and are not limited to the specific ordering shown in FIG. 9B.

Figure 11:
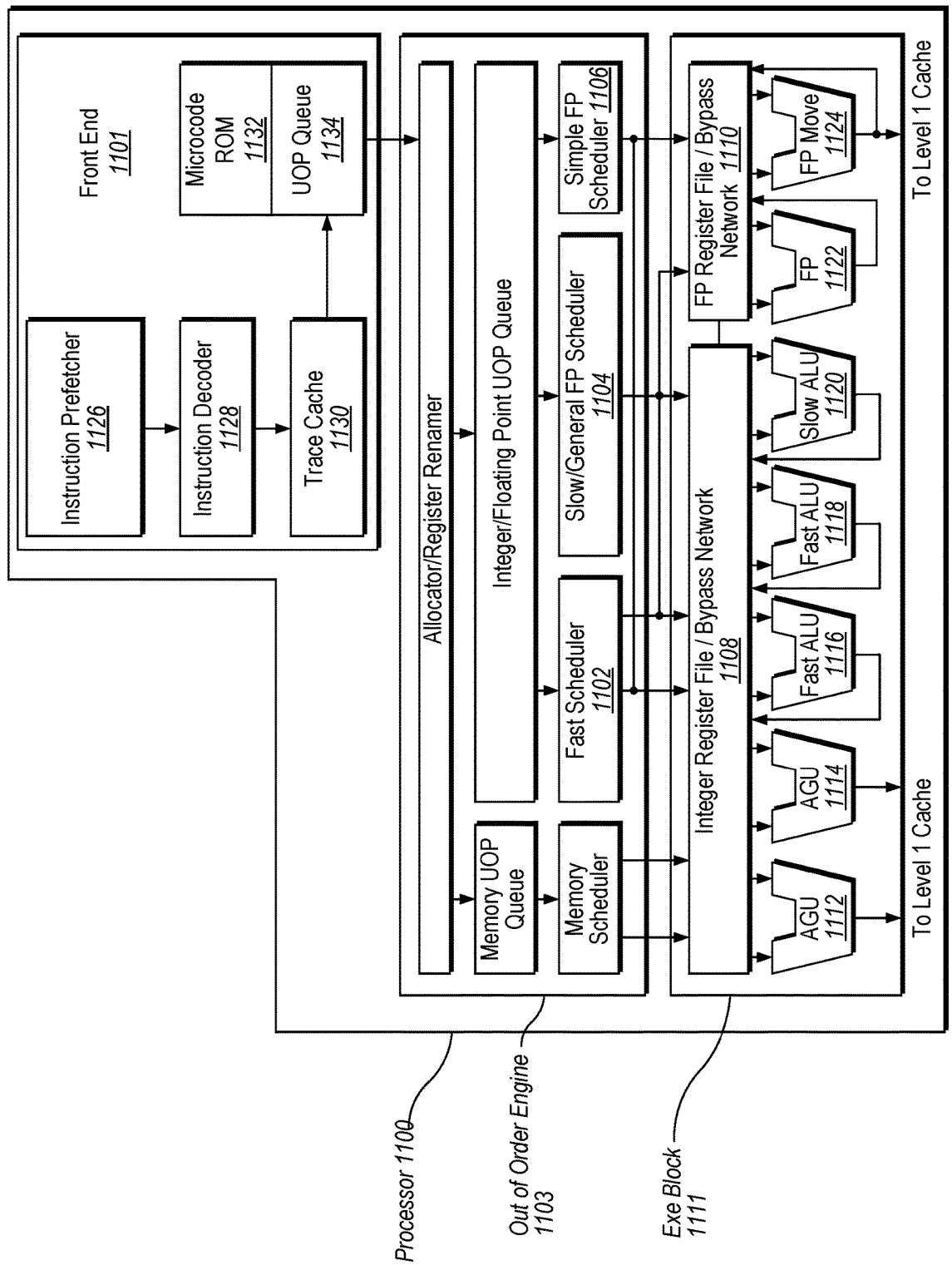
FIG. 11 illustrates a block diagram of the micro-architecture for a processor that includes logic circuits to perform Bitcoin mining operations according to one embodiment.

FIG. 11 illustrates a block diagram of the micro-architecture for a processor 1100 that includes logic circuits to perform Bitcoin mining hardware accelerator operations, according to one embodiment. In some embodiments, Bitcoin mining hardware accelerator operation instructions in accordance with one embodiment can be implemented to operate on data elements having sizes of byte, word, double-word, quadword, etc., as well as datatypes, such as single and double precision integer and floating point datatypes. In one embodiment the in-order front end 1101 is the part of the processor 1100 that fetches instructions to be executed and prepares them to be used later in the processor pipeline. The embodiments of the Bitcoin mining hardware accelerator operations disclosed herein can be implemented in processor 1100.

The front end 1101 may include several units. In one embodiment, the instruction prefetcher 1126 fetches instructions from memory and feeds them to an instruction decoder 1128 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 1130 takes decoded uops and assembles them into program ordered sequences or traces in the uop queue 1134 for execution. When the trace cache 1130 encounters a complex instruction, the microcode ROM 1132 provides the uops needed to complete the operation.

Some instructions are converted into a single micro-op, whereas others need several micro-ops to complete the full operation. In one embodiment, if more than four micro-ops are needed to complete an instruction, the decoder 1128 accesses the microcode ROM 1132 to do the instruction. For one embodiment, an instruction can be decoded into a small number of micro ops for processing at the instruction decoder 1128. In another embodiment, an instruction can be stored within the microcode ROM 1132 should a number of micro-ops be needed to accomplish the operation. The trace cache 1130 refers to an entry point programmable logic array (PLA) to determine a correct micro-instruction pointer for reading the micro-code sequences to complete one or more instructions in accordance with one embodiment from the micro-code ROM 1132. After the microcode ROM 1132 finishes sequencing micro-ops for an instruction, the front end 1101 of the machine resumes fetching micro-ops from the trace cache 1130.

The out-of-order execution engine 1103 is where the instructions are prepared for execution. The out-of-order execution logic has a number of buffers to smooth out and reorder the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 1102, slow/general floating point scheduler 1104, and simple floating point scheduler 1106. The uop schedulers 1102, 1104, 1106, determine when a uop is ready to execute based on the readiness of their dependent input register operand sources and the availability of the execution resources the uops need to complete their operation. The fast scheduler 1102 of one embodiment can schedule on each half of the main clock cycle while the other schedulers can only schedule once per main processor clock cycle. The schedulers arbitrate for the dispatch ports to schedule uops for execution.

Register files 1108, 1110, sit between the schedulers 1102, 1104, 1106, and the execution units 1112, 1114, 1116, 1118, 1120, 1122, 1124 in the execution block 1111. There is a separate register file 1108, 1110, for integer and floating point operations, respectively. Each register file 1108, 1110, of one embodiment also includes a bypass network that can bypass or forward just completed results that have not yet been written into the register file to new dependent uops. The integer register file 1108 and the floating point register file 1110 are also capable of communicating data with the other. For one embodiment, the integer register file 1108 is split into two separate register files, one register file for the low order 32 bits of data and a second register file for the high order 32 bits of data. The floating point register file 1110 of one embodiment has 128-bit wide entries because floating point instructions typically have operands from 64 to 128 bits in width.

The execution block 1111 contains the execution units 1112, 1114, 1116, 1118, 1120, 1122, 1124, where the instructions are actually executed. This section includes the register files 1108, 1110, that store the integer and floating point data operand values that the micro-instructions need to execute. The processor 1100 of one embodiment includes a number of execution units: address generation unit (AGU) 1112, AGU 1114, fast ALU 1116, fast ALU 1118, slow ALU 1120, floating point ALU 1122, floating point move unit 1124. For one embodiment, the floating point execution blocks 1112, 1114, execute floating point, MMX, SIMD, and SSE, or other operations. The floating point ALU 1112 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 1116, 1118. The fast ALUs 1116, 1118, of one embodiment can execute fast operations with an effective latency of half a clock cycle. For one embodiment, most complex integer operations go to the slow ALU 1110 as the slow ALU 1110 includes integer execution hardware for long latency type of operations, such as a multiplier, shifts, flag logic, and branch processing. Memory load/store operations are executed by the AGUs 1112, 1114. For one embodiment, the integer ALUs 1116, 1118, 1120, are described in the context of performing integer operations on 64 bit data operands. In alternative embodiments, the ALUs 1116, 1118, 1120, can be implemented to support a variety of data bits including 16, 32, 128, 256, etc. Similarly, the floating point units 1112, 1114, can be implemented to support a range of operands having bits of various widths. For one embodiment, the floating point units 1112, 1114, can operate on 128-bits wide packed data operands in conjunction with SIMD and multimedia instructions.

In one embodiment, the uops schedulers 1102, 1104, 1106, dispatch dependent operations before the parent load has finished executing. As uops are speculatively scheduled and executed in processor 1100, the processor 1100 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 1100 also includes logic to implement Bitcoin mining hardware accelerator operations according to one embodiment. In one embodiment, the execution block 1111 of processor 1100 may include a microcontroller (MCU), to perform Bitcoin mining operations according to the description herein.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 12:
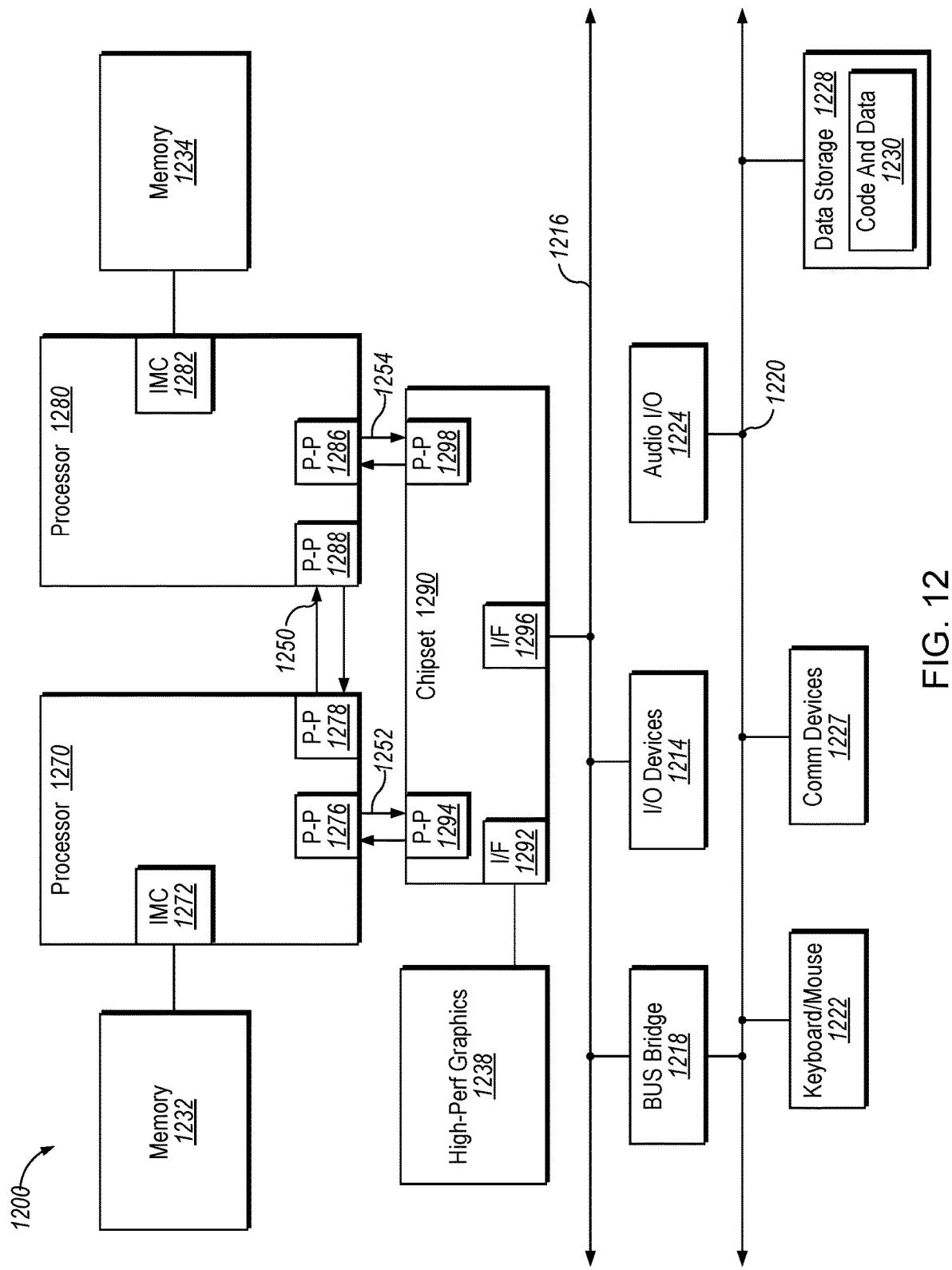
FIG. 12 is a block diagram of a computer system according to one embodiment.

Embodiments may be implemented in many different system types. Referring now to FIG. 12, shown is a block diagram of a multiprocessor system 1200 in accordance with an implementation. As shown in FIG. 12, multiprocessor system 1200 is a point-to-point interconnect system, and includes a first processor 1270 and a second processor 1280 coupled via a point-to-point interconnect 1250. As shown in FIG. 12, each of processors 1270 and 1280 may be multicore processors, including first and second processor cores, although potentially many more cores may be present in the processors. The processors each may include hybrid write mode logics in accordance with an embodiment of the present. Bitcoin mining hardware accelerator operations discussed herein can be implemented in the processor 1270, processor 1280, or both.

While shown with two processors 1270, 1280, it is to be understood that the scope of the present disclosure is not so limited. In other implementations, one or more additional processors may be present in a given processor.

Processors 1270 and 1280 are shown including integrated memory controller units 1272 and 1282, respectively. Processor 1270 also includes as part of its bus controller units point-to-point (P-P) interfaces 1276 and 1288; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 may each exchange information with a chipset 1290 via individual P-P interfaces 1252, 1254 using point to point interface circuits 1276, 1294, 1286, 1298. Chipset 1290 may also exchange information with a high-performance graphics circuit 1238 via a high-performance graphics interface 1239.

A shared cache (not shown) may be included in either processor or outside of both processors, yet connected with the processors via P-P interconnect, such that either or both processors' local cache information may be stored in the shared cache if a processor is placed into a low power mode.

Chipset 1290 may be coupled to a first bus 1216 via an interface 1292. In one embodiment, first bus 1216 may be a Peripheral Component Interconnect (PCI) bus, or a bus such as a PCI Express bus or another third generation I/O interconnect bus, although the scope of the present disclosure is not so limited.

As shown in FIG. 12, various I/O devices 1214 may be coupled to first bus 1216, along with a bus bridge 1218 which couples first bus 1216 to a second bus 1220. In one embodiment, second bus 1220 may be a low pin count (LPC) bus. Various devices may be coupled to second bus 1220 including, for example, a keyboard and/or mouse 1222, communication devices 1227 and a storage unit 1228 such as a disk drive or other mass storage device which may include instructions/code and data 1230, in one embodiment. Further, an audio I/O 1224 may be coupled to second bus 1220. Note that other architectures are possible. For example, instead of the point-to-point architecture of FIG. 12, a system may implement a multi-drop bus or other such architecture.

Figure 13:
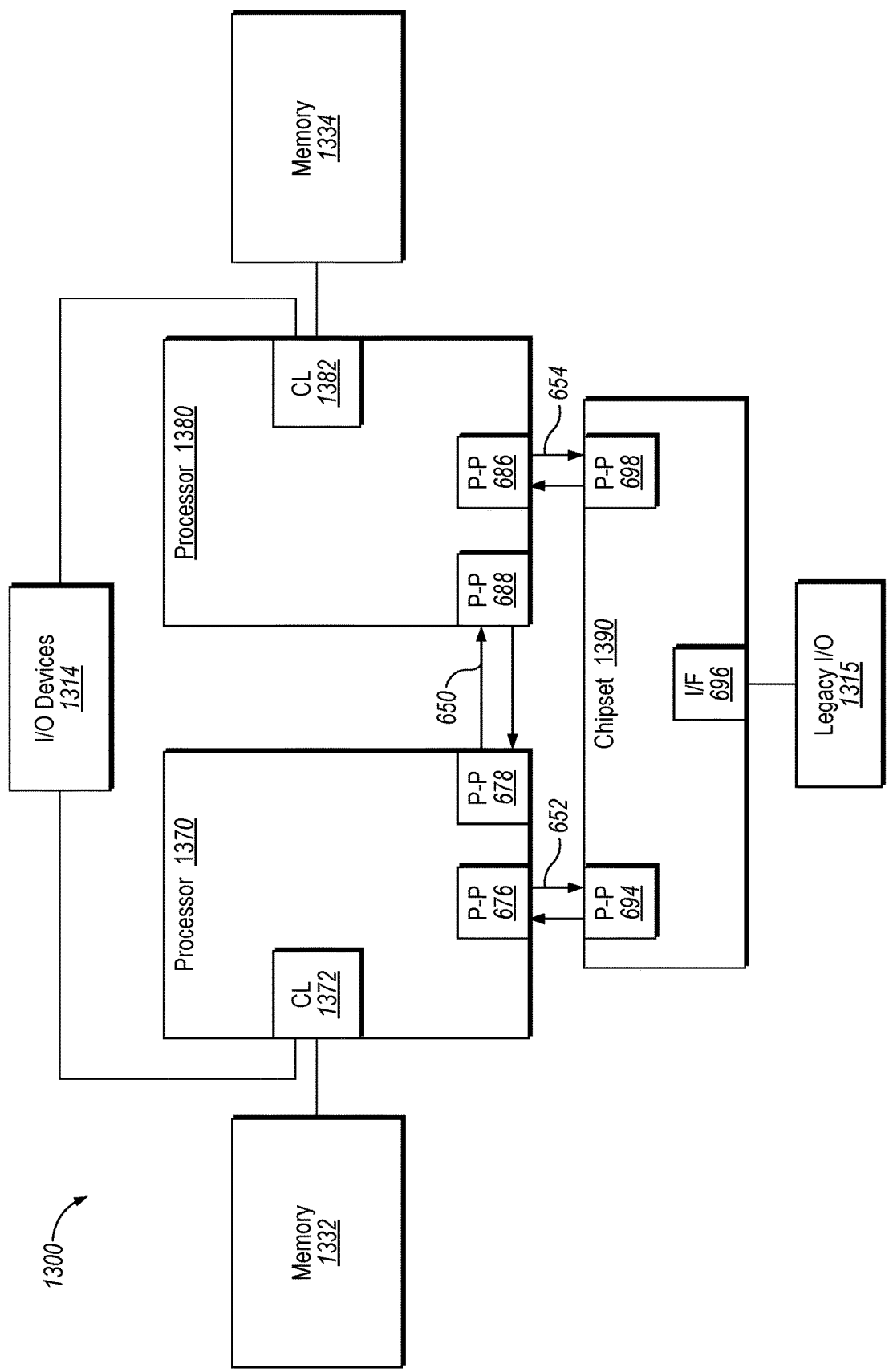
FIG. 13 is a block diagram of a computer system according to another embodiment.

Referring now to FIG. 13, shown is a block diagram of a third system 1300 in accordance with an embodiment of the present disclosure. Like elements in FIGS. 11 and 12 bear like reference numerals, and certain aspects of FIG. 12 have been omitted from FIG. 13 in order to avoid obscuring other aspects of FIG. 13.

FIG. 13 illustrates that the processors 1370, 1380 may include integrated memory and I/O control logic ("CL")

1372 and 1382, respectively. For at least one embodiment, the CL 1372, 1382 may include integrated memory controller units such as described herein. In addition. CL 1372, 1382 may also include I/O control logic. FIG. 13 illustrates that the memories 1332, 1334 are coupled to the CL 1372, 1382, and that I/O devices 1314 are also coupled to the control logic 1372, 1382. Legacy I/O devices 1315 are coupled to the chipset 1390. Operations discussed herein can be implemented in the processor 1370, processor 1380, or both.

Figure 14:
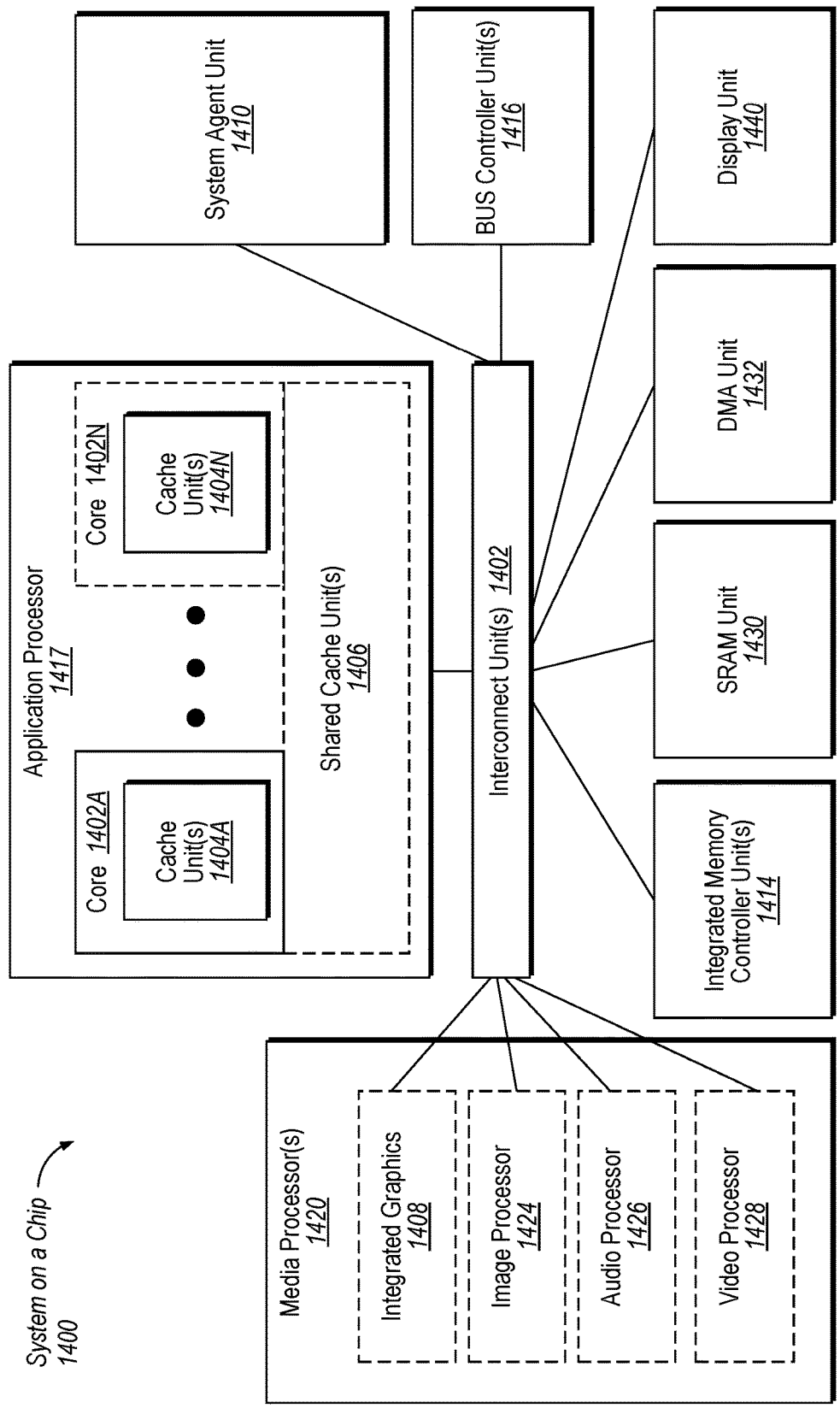
FIG. 14 is a block diagram of a system-on-a-chip according to one embodiment.

FIG. 14 is an exemplary system on a chip (SoC) 1400 that may include one or more of the cores 1402. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

FIG. 14 is a block diagram of a SoC 1400 in accordance with an embodiment of the present disclosure. Dashed lined boxes are features on more advanced SoCs. In FIG. 14 an interconnect unit(s) 1402 is coupled to: an application processor 1417 which includes a set of one or more cores 1402A-N, cache unit(s) 1404A-N, and shared cache unit(s) 1406; a system agent unit 1410; a bus controller unit(s) 1416; an integrated memory controller unit(s) 1414; a set or one or more media processors 1420 which may include integrated graphics logic 1408, an image processor 1424 for providing still and/or video camera functionality, an audio processor 1426 for providing hardware audio acceleration, and a video processor 1428 for providing video encode/decode acceleration; a static random access memory (SRAM) unit 1430; a direct memory access (DMA) unit 1432; and a display unit 1440 for coupling to one or more external displays. Bitcoin mining hardware accelerator operations discussed herein can be implemented by SoC 1400.

Figure 15:
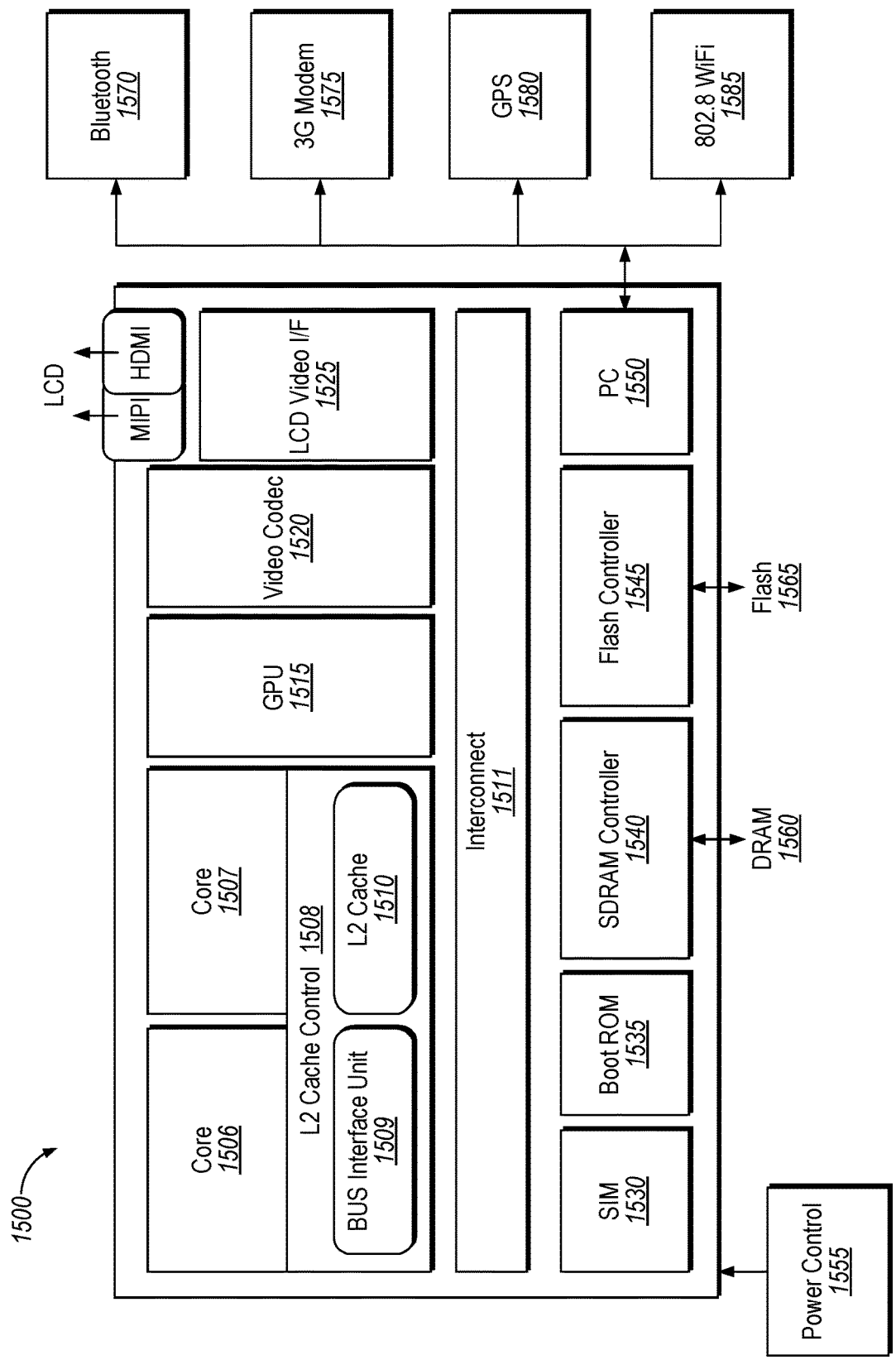
FIG. 15 illustrates another implementation of a block diagram for a computing system according to one embodiment.

Turning next to FIG. 15, an embodiment of a system on-chip (SoC) design in accordance with embodiments of the disclosure is depicted. As an illustrative example, SoC 1500 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. Bitcoin mining hardware accelerator operations discussed herein can be implemented by SoC 1500.

Here, SoC 1500 includes 2 cores—1506 and 1507. Similar to the discussion above, cores 1506 and 1507 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1506 and 1507 are coupled to cache control 1508 that is associated with bus interface unit 1509 and L2 cache 1510 to communicate with other parts of system 1500. Interconnect 1511 includes an on-chip interconnect, such as an IOSF, AMBA, or other interconnects discussed above, which can implement one or more aspects of the described disclosure.

Interconnect 1511 provides communication channels to the other components, such as a Subscriber Identity Module (SIM) 1530 to interface with a SIM card, a boot ROM 1535 to hold boot code for execution by cores 1506 and 1507 to initialize and boot SoC 1500, a SDRAM controller 1540 to interface with external memory (e.g. DRAM 1560), a flash controller 1545 to interface with non-volatile memory (e.g. Flash 1565), a peripheral control 1550 (e.g. Serial Peripheral Interface) to interface with peripherals, power control 1555 to control power, video codecs 1520 and Video interface 1525 to display and receive input (e.g. touch enabled input), GPU 1515 to perform graphics related computations, etc. Any of these interfaces may incorporate aspects of the embodiments described herein.

In addition, the system illustrates peripherals for communication, such as a Bluetooth module 1570, 3G modem 1575, GPS 1580, and Wi-Fi 1585. Note as stated above, a UE includes a radio for communication. As a result, these peripheral communication modules may not all be included. However, in a UE some form of a radio for external communication should be included.

Figure 16:
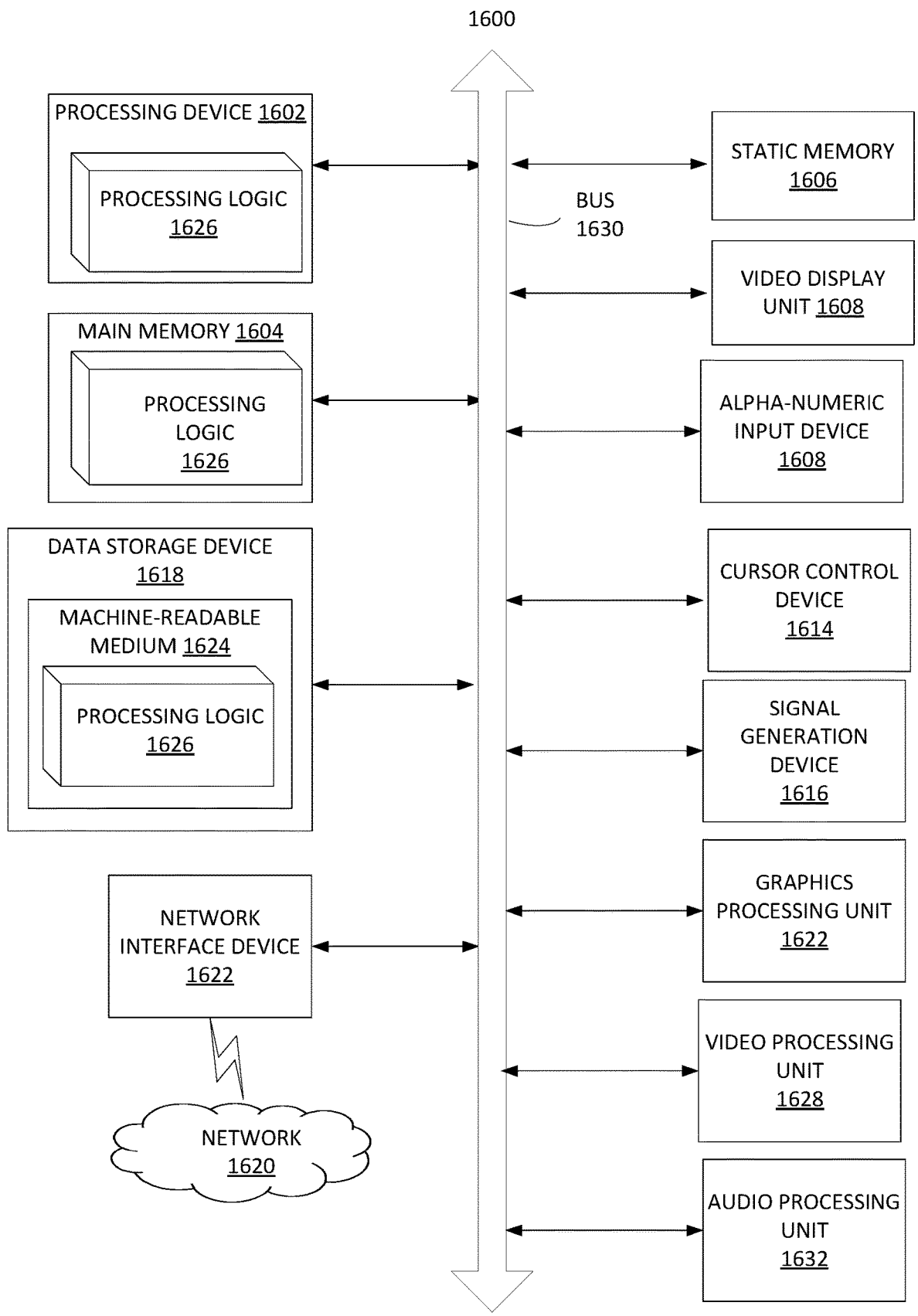
FIG. 16 illustrates another implementation of a block diagram for a computing system according to one implementation.

FIG. 16 illustrates a diagrammatic representation of a machine in the example form of a computing system 1600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The embodiments of the page additions and content copying can be implemented in computing system 1600.

The computing system 1600 includes a processing device 1602, main memory 1604 (e.g., read-only memory (ROM), flash memory, dynamic random access memory (DRAM) (such as synchronous DRAM (SDRAM) or DRAM (RDRAM), etc.), a static memory 1626 (e.g., flash memory, static random access memory (SRAM), etc.), and a data storage device 1618, which communicate with each other via a bus 1630.

Processing device 1602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1602 may also be one or more special-purpose processing devices such as an application specific integrated circuit (ASIC), a field programmable gate array (FPGA), a digital signal processor (DSP), network processor, or the like. In one embodiment, processing device 1602 may include one or processor cores. The processing device 1602 is configured to execute the processing logic 1626 for performing the Bitcoin mining hardware accelerator operations discussed herein. In one embodiment, processing device 1602 can be part of a computing system. Alternatively, the computing system 1600 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1600 may further include a network interface device 1622 communicably coupled to a network 1620. The computing system 1600 also may include a video display unit 1608 (e.g., a liquid crystal display (LCD) or a cathode ray tube (CRT)), an alphanumeric input device 1610 (e.g., a keyboard), a cursor control device 1614 (e.g., a mouse), a signal generation device 1616 (e.g., a speaker), or other peripheral devices. Furthermore, computing system 1600 may include a graphics processing unit 1622, a video processing unit 1628 and an audio processing unit 1632. In another embodiment, the computing system 1600 may include a chipset (not illustrated), which refers to a group of integrated circuits, or chips, that are designed to work with the processing device 1602 and controls communications between the processing device 1602 and external devices. For example, the chipset may be a set of chips on a motherboard that links the processing device 1602 to very high-speed devices, such as main memory 1604 and graphic controllers, as well as linking the processing device 1602 to lower-speed peripheral buses of peripherals, such as USB, PCI or ISA buses.

The data storage device 1618 may include a computer-readable storage medium 1624 on which is stored software 1626 embodying any one or more of the methodologies of functions described herein. The software 1626 may also reside, completely or at least partially, within the main memory 1604 as instructions 1626 and/or within the processing device 1602 as processing logic 1626 during execution thereof by the computing system 1600; the main memory 1604 and the processing device 1602 also constituting computer-readable storage media.

The computer-readable storage medium 1624 may also be used to store instructions 1626 utilizing the processing device 1602 and/or a software library containing methods that call the above applications. While the computer-readable storage medium 1624 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is a System on Chip (SoC) comprising: a processor core; and a hardware accelerator coupled to the processor core, the hardware accelerator to mine digital currency, the hardware accelerator comprising: a first computational block comprising a message digest datapath, wherein the first computational block is to: precompute a first summation of a 32-bit message ($W_i$), a 32-bit round constant ($K_i$), and a content of a first shifted state register ($G_{i-1}$); and store a result of the first summation in a state register ($H_i$); and a second computational block comprising a message scheduler datapath.

Example 2, the subject matter of Example 1, wherein the first computational block is further to: compute a complement of a content of a second shifted state register ($D_{i-1}$); compute a second summation of the complement, a content of a second state register ($E_i$), and a computed value; and store a result of the second summation in a state register ($A_i$).

Example 3, the subject matter of Example 2, wherein to precompute the first summation of the 32-bit message, the first computational block is further to add a content of a shifted register ($B_{i-2}$) to the first summation.

Example 4, the subject matter of Example 1, wherein the first computational block is further to: precompute a second summation of a complement of a content of a shifted state register ($C_{i-3}$), a shifted state register ($F_{i-1}$), and a computed value; and store a result of the second summation in a state register ($A_i$).

Example 5, the subject matter of Example 1, wherein the second computational block is to distribute a computation of a new message word across three cycles.

Example 6, the subject matter of Example 1, wherein the second computational block is to distribute a computation of a new message word across six cycles.

Example 7, the subject matter of Example 6, wherein the message scheduler datapath comprises nine logic gates.

Example 8, the subject matter of Example 1, wherein the digital currency is a Bitcoin.

Example 9 is a logic device to mine digital currency, comprising: a first computational block comprising a message digest datapath, wherein the first computational block is to: precompute a first summation of a 32-bit message ($W_i$), a 32-bit round constant ($K_i$), and a content of a first shifted state register ($G_{i-1}$); and store a result of the first summation in a state register ($H_i$); and a second computational block comprising a message scheduler datapath.

Example 10, the subject matter of Example 9, wherein the first computational block is further to: compute a complement of a content of a second shifted state register ($D_{i-1}$); compute a second summation of the complement, a content of a second state register ($E_i$), and a computed value; and store a result of the second summation in a state register ($A_i$).

Example 11, the subject matter of Example 10, wherein to precompute the first summation of the 32-bit message, the first computational block is further to add a content of a shifted register ($B_{i-2}$) to the first summation.

Example 12, the subject matter of Example 9, wherein the first computational block is further to: precompute a second summation of a complement of a content of a shifted state register ($C_{i-3}$), a shifted state register ($F_{i-1}$), and a computed value; and store a result of the second summation in a state register ($A_i$).

Example 13, the subject matter of Example 9, wherein the second computational block is to distribute a computation of a new message word across three cycles.

Example 14, the subject matter of Example 9, wherein the second computational block is to distribute a computation of a new message word across six cycles.

Example 15, the subject matter of Example 9, wherein the digital currency is a Bitcoin.

Example 16 is a system, comprising: a circuit board; a processor disposed in a first location of the circuit board; an off-chip logic device operatively coupled to the processor, disposed in a second location of the circuit board, wherein the off-chip logic device comprises: a first computational block comprising a message digest datapath, wherein the first computational block is to: precompute a first summation of a 32-bit message ($W_i$), a 32-bit round constant ($K_i$), and a content of a first shifted state register ($G_{i-1}$); and store a result of the first summation in a state register ($H_i$); and a second computational block comprising a message scheduler datapath.

Example 17, the subject matter of Example 16, wherein the first computational block is further to: add a content of a shifted register ($B_{i-2}$) to the first summation; compute a complement of a content of a second shifted state register ($D_{i-1}$); compute a second summation of the complement, a content of a second state register ($E_i$), and a computed value; and store a result of the second summation in a state register ($A_i$).

Example 18, the subject matter of Example 16, wherein the first computational block is further to: precompute a second summation of a complement of a content of a shifted state register ($C_{i-3}$), a shifted state register ($F_{i-1}$), and a computed value; and store a result of the second summation in a state register ($A_i$).

Example 19, the subject matter of Example 16, wherein the second computational block is to distribute a computation of a new message word across three cycles.

Example 20, the subject matter of Example 16, wherein the message scheduler datapath comprises nine logic gates.

Example 21 is an apparatus comprising: a processor core; and a hardware accelerator coupled to the processor core, the hardware accelerator to mine digital currency, the hardware accelerator comprising: a first computational block comprising a message digest datapath, wherein the first computational block is to: precompute a first summation of a 32-bit message ($W_i$), a 32-bit round constant ($K_i$), and a content of a first shifted state register ($G_{i-1}$); and store a result of the first summation in a state register ($H_i$); and a second computational block comprising a message scheduler datapath.

Example 22, the subject matter of Example 21, wherein the first computational block is further to: compute a complement of a content of a second shifted state register ($D_{i-1}$); compute a second summation of the complement, a content of a second state register ($E_i$), and a computed value; and store a result of the second summation in a state register ($A_i$).

Example 23, the subject matter of Example 22, wherein to precompute the first summation of the 32-bit message, the first computational block is further to add a content of a shifted register ($B_{i-2}$) to the first summation.

Example 24, the subject matter of Example 21, wherein the first computational block is further to: precompute a second summation of a complement of a content of a shifted state register ($C_{i-3}$), a shifted state register ($F_{i-1}$), and a computed value; and store a result of the second summation in a state register ($A_i$).

Example 25, the subject matter of Example 21, wherein the second computational block is to distribute a computation of a new message word across three cycles.

Example 26 is a System on Chip (SoC) comprising: a processor core; and a hardware accelerator coupled to the processor core, the hardware accelerator comprising means for mining digital currency, the hardware accelerator comprising: a first computational block comprising a message digest datapath, wherein the first computational block comprises means for: precomputing a first summation of a 32-bit message ($W_i$), a 32-bit round constant ($K_i$), and a content of a first shifted state register ($G_{i-1}$); and storing a result of the first summation in a state register ($H_i$); and a second computational block comprising a message scheduler datapath.

Example 27, the subject matter of Example 26, wherein the first computational block further comprises means for: computing a complement of a content of a second shifted state register ($D_{i-1}$); computing a second summation of the complement, a content of a second state register ($E_i$), and a computed value; and storing a result of the second summation in a state register ($A_i$).

Example 28, the subject matter of Example 27, wherein to precompute the first summation of the 32-bit message, the first computational block further comprises means for adding a content of a shifted register ($B_{i-2}$) to the first summation.

Example 29, the subject matter of Example 26, wherein the first computational block further comprises means for: precomputing a second summation of a complement of a content of a shifted state register ($C_{i-3}$), a shifted state register ($F_{i-1}$), and a computed value; and storing a result of the second summation in a state register ($A_i$).

Example 30, the subject matter of Example 26, wherein the second computational block comprises means for distributing a computation of a new message word across three cycles.

Example 31, the subject matter of Example 26, wherein the second computational block comprises means for distributing a computation of a new message word across six cycles.

Example 32, the subject matter of Example 31, wherein the message scheduler datapath comprises nine logic gates.

Example 33, the subject matter of Example 26, wherein the digital currency is a Bitcoin.

Example 34 is a logic device to mine digital currency, comprising: a first computational block comprising a message digest datapath, wherein the first computational block comprises means for: precomputing a first summation of a 32-bit message ($W_i$), a 32-bit round constant ($K_i$), and a content of a first shifted state register ($G_{i-1}$); and storing a result of the first summation in a state register ($H_i$); and a second computational block comprising a message scheduler datapath.

Example 35, the subject matter of Example 34, wherein the first computational block further comprises means for: computing a complement of a content of a second shifted state register ($D_{i-1}$); computing a second summation of the complement, a content of a second state register ($E_i$), and a computed value; and storing a result of the second summation in a state register ($A_i$).

Example 36, the subject matter of Example 35, wherein to precompute the first summation of the 32-bit message, the first computational block further comprises means for adding a content of a shifted register ($B_{i-2}$) to the first summation.

Example 37, the subject matter of Example 34, wherein the second computational block comprises means for distributing a computation of a new message word across three cycles.

Example 38 is a system, comprising: a circuit board; a processor disposed in a first location of the circuit board; an off-chip logic device operatively coupled to the processor, disposed in a second location of the circuit board, wherein the off-chip logic device comprises: a first computational block comprising a message digest datapath, wherein the first computational block comprises means for: precomputing a first summation of a 32-bit message ($W_i$), a 32-bit round constant ($K_i$), and a content of a first shifted state register ($G_{i-1}$); and storing a result of the first summation in a state register ($H_i$); and a second computational block comprising a message scheduler datapath.

Example 39, the subject matter of Example 38, wherein the first computational block further comprises means for: adding a content of a shifted register ($B_{i-2}$) to the first summation; computing a complement of a content of a second shifted state register ($D_{i-1}$); computing a second summation of the complement, a content of a second state register ($E_i$), and a computed value; and storing a result of the second summation in a state register ($A_i$).

Example 40, the subject matter of Example 38, wherein the second computational block comprises means for distributing a computation of a new message word across six cycles.

While embodiments of the present disclosure have been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of embodiments of the present disclosure. It will be apparent, however, to one skilled in the art that these specific details need not be employed to practice embodiments of the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring embodiments of the present disclosure.

The embodiments are described with reference to Bitcoin mining hardware accelerator operations in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processor or machine that performs data manipulations. However, embodiments of the present disclosure are not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions can be used to cause a general-purpose or special-purpose processor that is programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "encrypt," "decrypt," "perform," "multiplications," "key expansion," "add," "mix," "reduce," "merge," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A System on Chip (SoC) comprising:
   a processor core; and
   a hardware accelerator coupled to the processor core, the hardware accelerator to mine digital currency, the hardware accelerator comprising:
   a first computational block comprising a message digest datapath, wherein the first computational block is to:
   precompute a first summation of a 32-bit message ($W_i$), a 32-bit round constant ($K_i$), and content of a first shifted state register ($G_{i-1}$), wherein the content of the first shifted state register ($G_{i-1}$) is a shifted version of content of a first state register ($G_i$);
   store a result of the first summation in a second state register ($H_i$);
   compute a complement of content of a second shifted state register;
   compute a second summation of at least the complement and a computed value; and
   store a result of the second summation in a fourth state register ($A_i$); and
   a second computational block comprising a message scheduler datapath to retrieve the stored result of the first summation from the second state register ($H_i$) for a subsequent operation.

2. The SoC of claim 1, wherein to compute the second summation, the first computational block is further to add content of a third state register ($E_i$) to the complement and the computed value.

3. The SoC of claim 2, wherein to precompute the first summation of the 32-bit message, the first computational block is further to add content of a third shifted state register ($B_{i-2}$) to the first summation.

4. The SoC of claim 1, wherein to compute the second summation, the first computational block is further to add content of a fourth shifted state register ($F_{i-1}$) to the complement and the computed value.

5. The SoC of claim 1, wherein the second computational block is to distribute a computation of a new message word across three cycles.

6. The SoC of claim 1, wherein the second computational block is to distribute a computation of a new message word across six cycles.

7. The SoC of claim 6, wherein the message scheduler datapath comprises nine logic gates.

8. The SoC of claim 1, wherein the digital currency is a Bitcoin.

9. A logic device comprising:
a hardware accelerator to mine digital currency, the hardware accelerator comprising:
 a first computational block comprising a message digest datapath, wherein the first computational block is to:
  precompute a first summation of a 32-bit message ($W_i$), a 32-bit round constant ($K_i$), and content of a first shifted state register ($G_{i-1}$), wherein the content of the first shifted state register ($G_{i-1}$) is a shifted version of content of a first state register ($G_i$);
  store a result of the first summation in a second state register ($H_i$);
  compute a complement of content of a second shifted state register;
  compute a second summation of at least the complement and a computed value; and
  store a result of the second summation in a fourth state register ($A_i$); and
 a second computational block comprising a message scheduler datapath to retrieve the stored result of the first summation from the second state register ($H_i$) for a subsequent operation.

10. The logic device of claim 9, wherein to compute the second summation, the first computation block is further to add content of a third state register ($E_i$) to the complement and the computed value.

11. The logic device of claim 10, wherein to precompute the first summation of the 32-bit message, the first computational block is further to add content of a third shifted state register ($B_{i-2}$) to the first summation.

12. The logic device of claim 9, wherein to compute the second summation, the first computational block is further to add content of a fourth shifted state register ($F_{i-1}$) to the complement and the computed value.

13. The logic device of claim 9, wherein the second computational block is to distribute a computation of a new message word across three cycles.

14. The logic device of claim 9, wherein the second computational block is to distribute a computation of a new message word across six cycles.

15. The logic device of claim 9, wherein the digital currency is a Bitcoin.

16. A system, comprising:
a circuit board;
a processor disposed in a first location of the circuit board;
an off-chip logic device operatively coupled to the processor, disposed in a second location of the circuit board, wherein the off-chip logic device comprises:
 a first computational block comprising a message digest datapath, wherein the first computational block is to:
  precompute a first summation of a 32-bit message ($W_i$), a 32-bit round constant ($K_i$), and content of a first shifted state register ($G_{i-1}$), wherein the content of the first shifted state register ($G_{i-1}$) is shifted version of content of a first state register ($G_i$);
  store a result of the first summation in a second state register ($H_i$);
  compute a complement of content of a third shifted state register;
  compute a second summation of at least the complement and a computed value; and
  store a result of the second summation in a fourth state register ($A_i$); and
 a second computational block comprising a message scheduler datapath to retrieve the stored result of the first summation from the second state register ($H_i$) for a subsequent operation.

17. The system of claim 16, wherein the first computational block is further to add content of a second shifted state register ($B_{i-2}$) to the first summation and, wherein to compute the second summation, the first computation block is further to add content of a third state register ($E_i$) to the complement and the computed value.

18. The system of claim 16, wherein to compute the second summation, the first computational block is further to add content of a fourth shifted state register ($F_{i-1}$) to the complement and the computed value.

19. The system of claim 16, wherein the second computational block is to distribute a computation of a new message word across three cycles.

20. The system of claim 16, wherein the message scheduler datapath comprises nine logic gates.

* * * * *